(12) United States Patent
Glocker et al.

(10) Patent No.: US 10,670,734 B2
(45) Date of Patent: Jun. 2, 2020

(54) ADVANCED NAVIGATION SATELLITE SYSTEM POSITIONING METHOD AND SYSTEM USING DELAYED PRECISE INFORMATION

(71) Applicant: Trimble Inc., Sunnyvale, CA (US)

(72) Inventors: Markus Glocker, Munich (DE); Nicholas Charles Talbot, Ashburton (AU); Bruno Scherzinger, Ontario (CA)

(73) Assignee: Trimble Inc., Sunnyvale, CA (US)

( * ) Notice: Subject to any disclaimer, the term of this patent is extended or adjusted under 35 U.S.C. 154(b) by 315 days.

(21) Appl. No.: 15/690,105

(22) Filed: Aug. 29, 2017

(65) Prior Publication Data

US 2018/0074210 A1 Mar. 15, 2018

(30) Foreign Application Priority Data

Sep. 9, 2016 (EP) .................................... 16188047

(51) Int. Cl.
*G01S 19/42* (2010.01)
*G01S 19/44* (2010.01)
(Continued)

(52) U.S. Cl.
CPC .............. *G01S 19/42* (2013.01); *G01S 19/44* (2013.01); *G01S 19/43* (2013.01); *G01S 19/45* (2013.01);
(Continued)

(58) Field of Classification Search
CPC .......... G01S 19/42; G01S 19/44; G01S 19/47; G01S 19/45
(Continued)

(56) References Cited

U.S. PATENT DOCUMENTS 6,496,778 B1 * 12/2002 Lin ..................... G01S 19/55
701/470
6,735,523 B1 * 5/2004 Lin ..................... G01S 19/23
342/357.31

(Continued)

FOREIGN PATENT DOCUMENTS

WO 2012/151006 A1 11/2012
WO 2017/001320 A 1/2014

OTHER PUBLICATIONS

EP Office Action dated Dec. 7, 2018, for application EP 16 188.047.1-1812, 4 pages.
(Continued)

*Primary Examiner* — Chuong P Nguyen
(74) *Attorney, Agent, or Firm* — Kilpatrick Townsend & Stockton LLP

(57) ABSTRACT

The invention relates to a method carried out by a navigation satellite system (NSS) receiver or a processing entity receiving data therefrom, for estimating parameters useful to determine a position. The NSS receiver observes NSS signals from NSS satellites over multiple epochs. A first filter, called "timely estimator", and second filter, called "precise estimator" and delayed with respect to the timely estimator, are operated. The estimators use state variables, and make use of NSS signals observed by the NSS receiver or information derived therefrom. The precise estimator further computes its state variable values based on observations that are not derived from NSS signals observed by the NSS receiver. The values of some of the state variables computed by the timely estimator are recurrently replaced by values from the precise estimator. A corresponding system is also disclosed.

15 Claims, 15 Drawing Sheets

(51) Int. Cl.
- *G01S 19/43* (2010.01)
- *G01S 19/49* (2010.01)
- *G01S 19/48* (2010.01)
- *G01S 19/45* (2010.01)
- *G01S 19/47* (2010.01)

(52) U.S. Cl.
CPC .............. *G01S 19/47* (2013.01); *G01S 19/48* (2013.01); *G01S 19/49* (2013.01)

(58) Field of Classification Search
USPC .............. 342/357.27, 357.25, 357.3, 357.28
See application file for complete search history.

(56) References Cited

U.S. PATENT DOCUMENTS

| | | | | |
|---|---|---|---|---|
| 7,409,289 B2* | 8/2008 | Coatantiec | ............... | G01S 19/23 342/357.62 |
| 7,409,290 B2* | 8/2008 | Lin | ............... | G01C 21/165 342/357.27 |
| 7,490,008 B2* | 2/2009 | Draganov | ............... | G01S 19/47 701/472 |
| 7,680,221 B2* | 3/2010 | Lillo | ............... | G01S 19/47 375/142 |
| 8,694,250 B2* | 4/2014 | Talbot | ............... | G01S 19/04 701/477 |
| 8,717,237 B2* | 5/2014 | Vollath | ............... | G01S 19/13 342/450 |
| 8,825,396 B2* | 9/2014 | Scherzinger | ......... | G01C 21/165 342/357.21 |
| 9,405,012 B2* | 8/2016 | Doucet | ............... | G01S 19/25 |
| 9,784,582 B2* | 10/2017 | Georgy | ............... | G01S 19/47 |
| 2010/0048140 A1 | 2/2010 | Tajima et al. | | |
| 2014/0375493 A1 | 12/2014 | Weisenburger et al. | | |
| 2017/0045624 A1* | 2/2017 | Drescher | ............... | G01S 19/07 |
| 2018/0172838 A1* | 6/2018 | Junker | ............... | G01S 19/29 |
| 2019/0196024 A1* | 6/2019 | Chen | ............... | G01S 19/29 |

OTHER PUBLICATIONS

Carlson, N. A., "Federated Square Root Filter for Decentralized Parallel Processes," IEEE Transactions on Aerospace and Electronic Systems, vol. 26, No. 3, May 1990, pp. 517-525.

Extended European Search Report for Application No. 16188047.1-1812, dated Mar. 9, 2017, 7 pages.

Grewal, M. S., "Applications of Kalman Filtering in Aerospace 1960 to the Present,"—Historical Perspectives. *IEEE Control Systems Magazine*, Jun. 2010, pp. 69-78.

\* cited by examiner

ADVANCED NAVIGATION SATELLITE SYSTEM POSITIONING METHOD AND SYSTEM USING DELAYED PRECISE INFORMATION

CROSS-REFERENCE TO RELATED APPLICATIONS

The present application claims priority to European Application No. EP 16 188 047.1 filed Sep. 9, 2016, the entire contents of which are incorporated herein by reference for all purposes.

FIELD OF TECHNOLOGY

The invention relates to global or regional navigation satellite systems (NSS) position estimation methods, systems and computer programs. The fields of application of the methods, devices and computer programs include, but are not limited to, navigation, map-making, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BeiDou (China), QZSS (Japan), and the Indian Regional Navigational Satellite System (IRNSS) (systems in use or in development). A NSS typically uses a plurality of satellites orbiting the Earth. The plurality of satellites forms a constellation of satellites. A NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of reference [A] (a list of references is provided at the end of the present description).

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. down to centimetre-level or even millimetre-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the number of cycles cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [A], section 5. An introduction to the GNSS integer ambiguity resolution problem, and its conventional solutions, is provided in reference [A], section 7.2. The skilled person will recognize that the same or similar principles apply to RNSS systems.

The main GNSS observables are therefore the carrier phase and code (pseudorange), the former being much more precise than the latter, but ambiguous. These observables enable a user to obtain the geometric distance from the receiver to the satellite. With known satellite position and satellite clock error, the receiver position can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third L5 frequency are becoming available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequency is modulated with a pseudo-random number (PRN) code, and with satellite navigation data. Two different PRN codes are transmitted by each satellite: a C/A code and a P code which is encrypted for DoD-authorized users. Each C/A code is a unique sequence of 1023 bits, which is repeated each millisecond. Other NSS systems also have satellites transmitting multiple signals on multiple carrier frequencies.

Reference [B] relates to processing GNSS data for enhanced real-time kinematic (RTK) positioning. Paragraph [0005] thereof explains that, in traditional RTK positioning, "the rover receiver (rover) collects real-time GNSS signal data and receives correction data from a base station, or a network of reference stations", but the correction data arrives "at the rover with a finite delay (latency) due to processing and communication". The delay (latency) problem associated with the correction data is further discussed in reference [B], paragraphs [0006], and [0008] to [0015]. Delta phase methods have been proposed to address that problem (reference [B], paragraphs [0007], and [0036] ff.), by means of a Kalman filter that uses carrier phase increments, called delta phases, to propagate a position solution from a past time to a current time.

There is a constant need for improving the implementation of positioning systems based notably on GNSS (or RNSS) measurements, to obtain a precise estimation of the receiver position, and in particular to quickly obtain a precise estimation, so as to increase the productivity of positioning systems.

SUMMARY

The present invention aims at addressing, at least partially, the above-mentioned need. The invention includes methods, systems, and computer programs as defined in the independent claims. Particular embodiments are defined in the dependent claims.

In one embodiment, a method is carried out by a NSS receiver and/or a processing entity capable of receiving data from the NSS receiver, in order to estimate parameters useful to determine a position (such as for example the position of the NSS receiver). The NSS receiver observes a NSS signal from each of a plurality of NSS satellites over multiple epochs, each of these epochs being hereinafter referred to as "receiver epoch". The method comprises operating a first filter, hereinafter referred to as "timely estimator", and a second filter, hereinafter referred to as "precise estimator". Each of the timely estimator and precise estimator uses state variables. Each of the timely estimator and precise estimator computes values of their state variables based on: NSS signals observed by the NSS receiver, and/or information derived from said NSS signals. Furthermore, the precise estimator computes the values of the state variables that it uses further based on: observations that are not derived from NSS signals observed by the NSS receiver, and/or information derived from said observations. The precise estimator is delayed by at least one receiver epoch with respect to the timely estimator. The method further comprises recurrently replacing, in the timely estimator, the values of each of some of the state variables computed by the timely estimator with: (i) the respective value of the corresponding state variable computed by the precise estimator, (ii) a respective value computed based on the values of some of the state variables computed by the precise estimator, and (iii) a respective value computed based on: the values of some of the state variables computed by the timely estimator and the values of some of the state variables computed by the precise estimator.

The method therefore enables a transfer of precision from the precise estimator to the timely estimator, in such a manner that the timely estimator generally provides a more precise navigation solution than if it were operating on its own.

The invention also relates, in one embodiment, to a system comprising a NSS receiver and/or a processing entity capable of receiving data from the NSS receiver, in order to estimate parameters useful to determine a position. The NSS receiver observes a NSS signal from each of a plurality of NSS satellites over multiple epochs, each of these epochs being referred to as "receiver epoch". The system comprises a first filter, referred to as "timely estimator", and a second filter, referred to as "precise estimator". Each of the timely estimator and precise estimator is configured to use state variables. Each of the timely estimator and precise estimator is configured to compute values of their state variables based on: NSS signals observed by the NSS receiver, and/or information derived from said NSS signals. Furthermore, the precise estimator is configured to compute the values of the state variables that it uses further based on: observations that are not derived from NSS signals observed by the NSS receiver, and/or information derived from said observations. The precise estimator is configured to be delayed by at least one receiver epoch with respect to the timely estimator. Furthermore, the system is configured for recurrently replacing, in the timely estimator, the values of each of some of the state variables computed by the timely estimator with: (i) the respective value of the corresponding state variable computed by the precise estimator, (ii) a respective value computed based on the values of some of the state variables computed by the precise estimator, and (iii) a respective value computed based on: the values of some of the state variables computed by the timely estimator and the values of some of the state variables computed by the precise estimator.

The invention also relates, in some embodiments, to computer programs, computer program products, and storage mediums for storing such computer programs, comprising computer-executable instructions for carrying out, when executed on a computer such as one embedded in a NSS receiver or in another apparatus, the above-mentioned method.

BRIEF DESCRIPTION OF THE DRAWINGS

Embodiments of the present invention shall now be described, in conjunction with the appended drawings in which.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive. A list of abbreviations and their meaning is provided at the end of the detailed description.

Throughout the following detailed description, the abbreviation "GNSS" is sometimes used. The invention is, however, not limited to global navigation satellite systems (GNSS) but also applies to regional navigation satellite systems (RNSS). Thus, it is to be understood that each occurrence of "GNSS" in the following can be replaced by "RNSS" to form additional embodiments.

When the term "real-time" is used in the present document, it means that there is an action (e.g., data is processed, results are computed) as soon as the required information for that action is available. Thus, certain latency may exist, which depends on various aspects depending on the involved component(s) of the system.

Figure 1:
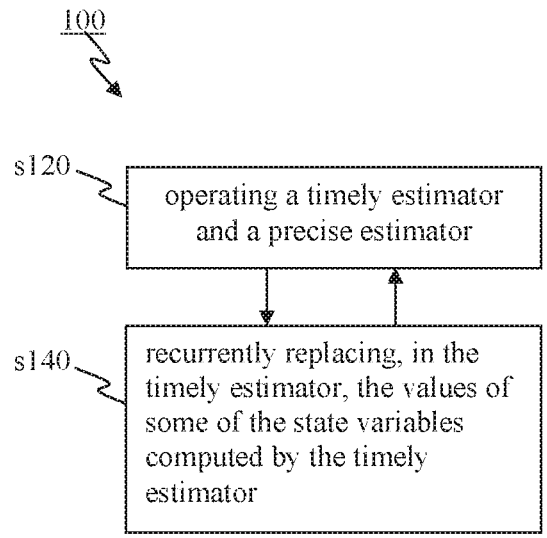
FIG. 1 is a flowchart of a method in one embodiment of the invention.

FIG. 1 is a flowchart of a method 100 in one embodiment of the invention. Method 100 is carried out by a NSS receiver and/or a processing entity capable of receiving data from the NSS receiver. This means that embodiments of the invention may be carried out (a) in a NSS receiver, (b) in another processing entity, for example for post-mission processing purposes, or (c) in both NSS receiver and another processing entity.

The purpose of the method is to estimate parameters useful to determine a position, such as for example the position of the NSS receiver.

The estimated parameters may for example indicate the most probable number of carrier cycles along the distance separating a NSS satellite from the NSS receiver, i.e. the estimated parameters may be the resolved integer ambiguity. This also means that the method may output the position itself but not necessarily: parameters may be output that may be used, for example by another entity (such as a processing entity on a server dedicated to such task), to estimate or determine the position of the NSS receiver (i.e., the rover position) or of a reference station. Furthermore, other parameters such as, for example, properties of the ionosphere may be output. Indeed, if the position of both the NSS receiver and the plurality of NSS satellites are known, resolving the integer ambiguities may enable the determination of parameters affecting the transmission of the signals (or some components thereof) through the ionosphere or other parts of the atmosphere. Yet furthermore, beyond determining the position of a rover or a reference station, if the position of NSS receivers (such as reference stations) is known, solving the integer ambiguities in the carrier phases by solving observation equations may also be used to eventually determine the position of a satellite.

The NSS receiver observes a NSS signal from each of a plurality of NSS satellites over multiple epochs. Each of these epochs is here referred to as "receiver epoch". The observed NSS signal may for example be a GPS signal (such as for example the L1 or L2 signal), a GLONASS signal, a Galileo signal, a BeiDou signal, a QZSS signal, or an IRNSS signal. If a given NSS satellite emits more than one NSS signal, the NSS receiver may observe more than one NSS signal from said satellite. Furthermore, the NSS receiver may observe NSS signals from a single NSS or, alternatively, from a plurality of different NSS.

Method 100 comprises operating s120 at least a first filter 55, referred to as "timely estimator", and a second filter 57, referred to as "precise estimator". In that context, a filter is or comprises an algorithm or process, or a piece of software and/or hardware configured for implementing such an algorithm or process, in which a set of state variables (or "state vector") are maintained over time, i.e. the values of the state variables are estimated based on a series of measurements made over time.

Timely estimator 55 may comprise, for example, a Kalman filter, a least squares estimator, and/or a robust estimator. Precise estimator 57 may also comprise, for example, a Kalman filter, a least squares estimator, and/or a robust estimator. In one embodiment, each of timely estimator 55 and precise estimator 57 comprises a Kalman filter. In another embodiment, each of timely estimator 55 and precise estimator 57 comprises a least squares estimator. In another embodiment, each of timely estimator 55 and precise estimator 57 comprises a robust estimator. The invention is, however, not limited to the use of Kalman filter(s), least squares estimator(s), and/or robust estimator(s).

Timely estimator 55 and precise estimator 57 use state variables. Some of the state variables may be common to the two estimators and at least some of the state variables are unique to each of them. The state variables that are common to the two estimators, if any, are referred to as "common state variables", while those being unique to each of the estimators are referred to as "unique state variables". In other words, timely estimator 55 uses M common state variables and $N_T$ unique state variables, wherein M is a non-negative integer (i.e., M≥0) and $N_T$ is a positive integer (i.e., $N_T$≥1), and precise estimator 57 uses the same M common state variables as those used by timely estimator 55, as well as $N_P$ unique state variables, wherein $N_P$ is a positive integer (i.e., $N_P$≥1). The values of each of the state variables in each of the two estimators are generally computed at each receiver epoch.

Each of timely estimator 55 and precise estimator 57 computes the respective values of their state variables based on NSS signals observed by the NSS receiver, and/or based on information derived from said NSS signals. In one embodiment, each of timely estimator 55 and precise estimator 57 computes the respective values of their state variables based on carrier phase measurements generated from the NSS signals observed by the NSS receiver.

Precise estimator 57 computes the values of its state variables further based on observations that are not derived from NSS signals observed by the NSS receiver, and/or based on information derived from said observations (i.e. based on information derived from observations that are not derived from NSS signals observed by the NSS receiver). These observations and/or the information derived therefrom are delayed when they reach or are used by precise estimator 57. In one embodiment, said observations comprise NSS observations from at least one reference NSS receiver.

For example the delayed precise information that precise estimator 57 receives comprises correction information obtained by a network of reference stations. The correction information may comprise correction data relating to NSS satellites, such as, but not limited to, accurate orbital data and accurate satellite clock data. The correction information may be computed or prepared by a network of reference receivers with precisely known positions in a global reference frame (i.e., coordinate system). A typically world-wide network of reference receivers is used for GNSS systems, whereas a regional network of reference receivers is typically sufficient for RNSS systems. The data from the reference receivers is transmitted for example over the internet to a processing centre, where the data is collected, synchronized and processed. During the data processing, a variety of products can be generated, including e.g. satellite orbits, satellite clock errors, GNSS (or RNSS) measurement biases, and atmospheric effects. The products (or corrections) may then be sent to the NSS receivers (i.e., the rovers) on the field. The transmission to the NSS receivers may take place in many different forms, of which the most commonly used are the internet and satellite links. For a descriptive example of a global GNSS positioning correction service see e.g. WO 2011/034616 A2.

In one embodiment, said observations comprise delayed NSS data, i.e. NSS information that is delayed. However, the observations may also comprise delayed non-NSS data, i.e. non-NSS information that is somehow delayed, such as for example a user-provided dynamic position fix that required a sequence of user operations to produce a solution.

Precise estimator 57 is delayed by at least one receiver epoch with respect to timely estimator 55. This therefore means that precise estimator 57 computes the values of its state variables based on (a) NSS signals observed by the NSS receiver, and/or information derived from said NSS signals, after intentionally delaying this first input, e.g. by buffering the information, and (b) observations that are not derived from NSS signals observed by the NSS receiver, and/or information derived from said observations, this second input being delayed due to, for example, the acquisition, processing, and/or transfer of the information.

Method 100 further comprises recurrently replacing s140, in timely estimator 55, the values of some of (i.e., a subset of) the state variables computed by timely estimator 55 with one of: (i) the values of the corresponding state variables computed by precise estimator 57 (as illustrated for example by FIG. 2a, 2b, 3a, 3b, or 4a), (ii) values computed based on the values of some of the state variables computed by precise estimator 57 (as illustrated for example by FIG. 4b); and (iii) values computed based on: the values of some of the state variables computed by timely estimator 55 and the values of some of the state variables computed by precise estimator 57 (as illustrated for example by FIG. 2c, 2d, 3c, 3d, or 4d). This operation causes a transfer of accuracy to take place from precise estimator 57, which is more accurate but delayed, to timely estimator 55, which is less accurate but timely, i.e. less latent.

This transfer of accuracy is advantageous over to the delta phase methods referred to in the above "Background" section at least for the following reasons:

First, a delta-phase method may be regarded as an ad hoc (i.e., not theoretically justified) cascading of two estimation processes: a latent synchronous estimator and an antenna position extrapolator. The timely position standard deviation provided by the delta-phase method is the root-sum-square of the delayed position standard deviation and the delta position standard deviation. This, however, is generally not as accurate as the position standard deviation obtained by means of the above-referred transfer of accuracy, especially, but not only, for embodiments wherein the position standard deviation is obtained by means of a federated filter with delayed precise estimator and near constant lumped bias collation (as discussed below).

Secondly, in terms of applicability, in the above-described embodiment, the same type of transfer of accuracy, such as for example by means of the same federated filter architecture, may be used with any aided navigator configuration and thus allows a generic implementation usable for different aided navigator configurations.

In one embodiment, the recurrent replacement s140 is carried out at each receiver epoch. In one embodiment, the recurrent replacement s140 is carried out at each receiver epoch and occurs after the update, in timely estimator 55, of the state variable values based on the observations available for the current receiver epoch. In another embodiment, the recurrent replacement s140 is carried out at each receiver epoch and occurs before the update, in timely estimator 55, of the state variable values based on the observations available for the current receiver epoch. In yet another embodiment, the recurrent replacement s140 is carried out at each receiver epoch and occurs both before and after the update, in timely estimator 55, of the state variable values based on the observations available for the current receiver epoch.

In the following, the state variables that are recurrently replaced s140 in timely estimator 55 are referred to as "reset-designated state variables", and there are R reset-designated state variables, wherein R is a positive integer (i.e., R≥1). The reset-designated state variables may be (i) state variables maintained by both timely estimator 55 and precise estimator 57, or (ii) state variables that are maintained by timely estimator 55 and that can be computed based on state variables maintained by precise estimator 57 (this second possibility is further discussed later when it comes to lumping parameters together into a composite state variable).

In one embodiment, there are common state variables (i.e., M≥0), all common state variables are also reset-designated state variables, so that R equals to M (i.e., R=M), and all common state variables are recurrently replaced s140 in timely estimator 55.

In another embodiment, there are common state variables (i.e., M>0), only some of the common state variables are reset-designated state variables, so that R is smaller than M (i.e., R<M), and therefore only some of the common state variables are recurrently replaced s140 in timely estimator 55.

In one embodiment, the reset-designated state variables are chosen among the available state variables by virtue of having, or being expected to have, predictable behaviour over the time interval by which precise estimator 57 is delayed with respect to timely estimator 55. Selecting such reset-designated state variables is beneficial to the transfer of accuracy in that the retention of information over the delay between the estimators causes, or is expected to cause, the position accuracy outputted by timely estimator 55 to be more accurate with recurrent replacement than without recurrent replacement.

In one embodiment, the reset-designated state variables are chosen among the available state variables by virtue of having, or being expected to have, constant or near constant stochastic models over the time interval by which precise estimator 57 is delayed with respect to timely estimator 55. Selecting such reset-designated state variables is also beneficial to the transfer of accuracy for the same reasons as described above, i.e. because the retention of information over the delay between the estimators causes, or is expected to cause, the position accuracy produced by timely estimator 55 to be more accurate with recurrent replacement than without it. In that respect, the expression "expected to have near constant stochastic models over the time interval by which precise estimator is delayed with respect to timely estimator" means that the state variable(s) under consideration is expected to have a stochastic model with a sufficiently small rate of change over said time interval to have a negligible effect on the determination of position. By "negligible effect", it is meant that a position accuracy at a reference level, such as for example any one of 1 cm, 5 cm and 10 cm, is not compromised by the small rate of change of the stochastic model.

In one embodiment, the reset-designated state variables comprise at least one of: ionospheric biases, tropospheric biases, satellite orbital biases, satellite clock errors (which are regarded in the present document as also including satellite group delay biases), carrier phase ambiguities, carrier phase multipath errors, and code phase multipath errors. Some or all of these parameters may be included as reset-designated state variables.

For example, in a first sub-embodiment, the carrier phase multipath errors and code phase multipath errors are included as part of the reset-designated state variables, whereas, in a second sub-embodiment, those are not part of the reset-designated state variables. The code phase multipath errors and carrier phase multipath errors are typically changing relatively slowly over time for a static user (i.e., a static NSS receiver), whereas, for a user in motion (i.e., a NSS receiver in motion), these multipath errors may change more rapidly. Thus, these errors may either be regarded as having a stochastic model being sufficiently constant to be included as part of the reset-designated state variables, or, otherwise, it may be decided not to include them as part of the reset-designated state variables.

The reset-designated state variables may also comprise other biases or errors, depending for example on the stability of their stochastic model. For example, in one embodiment, the reset-designated state variable may include the receiver clock error if the receiver clock is stable enough, depending therefore on the type of NSS receiver.

In one embodiment, some of the above-referred parameters are grouped or "lumped" together for convenience and to achieve computational efficiency, as for example illustrated by equations (34) and (39) below. For example, a composite state variable may be a function of other state variables, and this composite state variable is regarded as part of the reset-designated state variables. In particular, in one embodiment, the reset-designated state variables comprise at least one of: carrier phase biases (see for example equation (34) below), code phase biases (see for example equation (39) below), and carrier-phase-smoothed code phase biases. In one embodiment, the carrier phase biases include: the satellite orbital biases, the satellite clock errors, the tropospheric biases, the ionospheric biases, and the carrier phase ambiguities. In one embodiment, the code phase biases include: the satellite orbital biases, the satellite clock errors, the tropospheric biases, and the ionospheric biases.

In the embodiments wherein parameters are grouped or "lumped" together into composite reset-designated state variables, precise estimator 57 may but is not required to maintain these composite state variables explicitly; precise estimator 57 may maintain them implicitly. Maintaining a composite state variable implicitly is here defined as (a) maintaining some state variables, hereinafter referred to as "component state variables", explicitly, and (b) being able, at any epoch, to compute the values of the composite state variables from the value of the component state variables and the associated covariance matrix of the composite state variables. The computation of the composite state variables can be described by the following linear transformation for a simple 3-satellite example:

$$\begin{bmatrix} b_1 \\ b_2 \\ b_3 \end{bmatrix} = \begin{bmatrix} 1 & 1 & \lambda_1 & 0 & 0 & 0 & 0 & 0 & 0 \\ 0 & 0 & 0 & 1 & 1 & \lambda_2 & 0 & 0 & 0 \\ 0 & 0 & 0 & 0 & 0 & 0 & 1 & 1 & \lambda_3 \end{bmatrix} \begin{bmatrix} \delta r_1^{tropo} \\ \delta r_1^{iono} \\ N_1 \\ \delta r_2^{tropo} \\ \delta r_2^{iono} \\ N_2 \\ \delta r_3^{tropo} \\ \delta r_3^{iono} \\ N_3 \end{bmatrix}$$

where $b_1$, $b_2$, and $b_3$ are composite state variables for each of the three satellites; $\lambda_1$, $\lambda_2$, and $\lambda_3$ are the carrier phase measurement wavelengths associated with each of the three satellites; and $\delta r_i^{tropo}$, $\delta r_i^{iono}$, and $N_i$ are as defined below, right after equation (32).

The above equation can be written in simplified vector/matrix form as:

$$b = Hx$$

The associated covariance matrix of the composite variables is formed by:

$$Q_b = H Q_x H^T$$

where $Q_x$ is the covariance matrix of the component state variables and $Q_b$ is the covariance matrix of the composite variables.

Figure 4A:
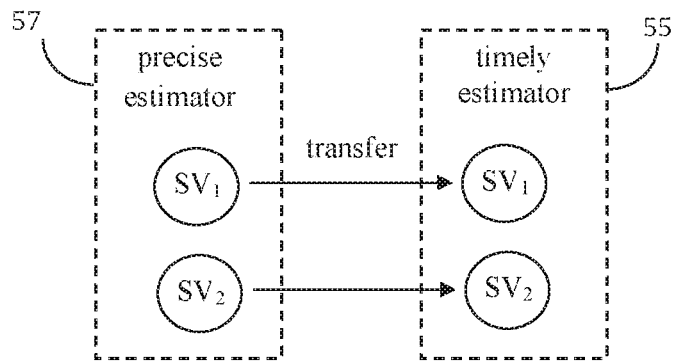
FIGS. 4a to 4f schematically illustrate the transfer of accuracy from the precise estimator to the timely estimator in six embodiments of the invention.
Figure 4B:
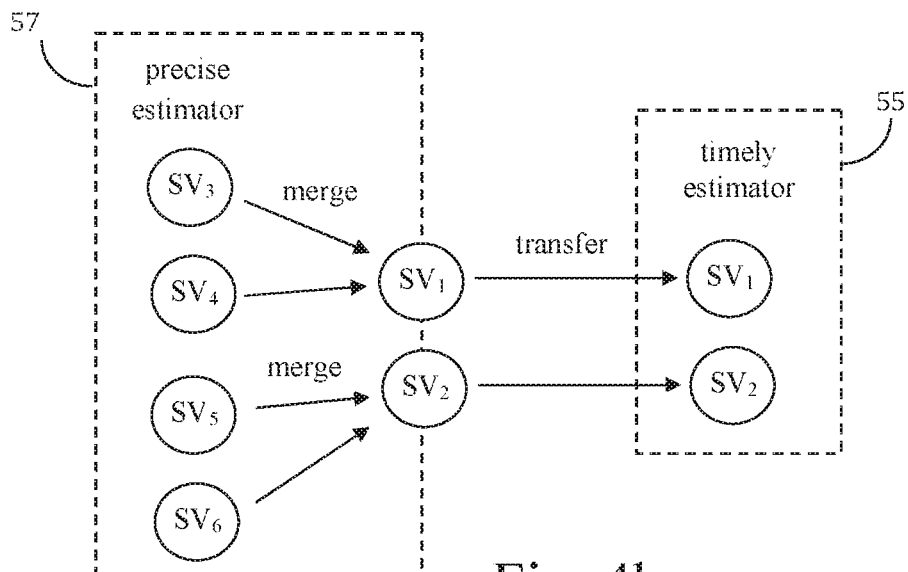
Figure 4C:
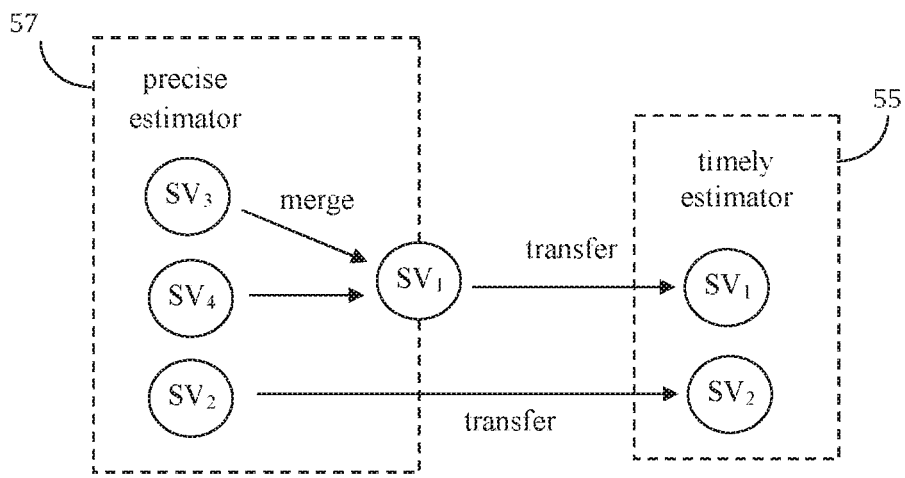
Figure 4D:
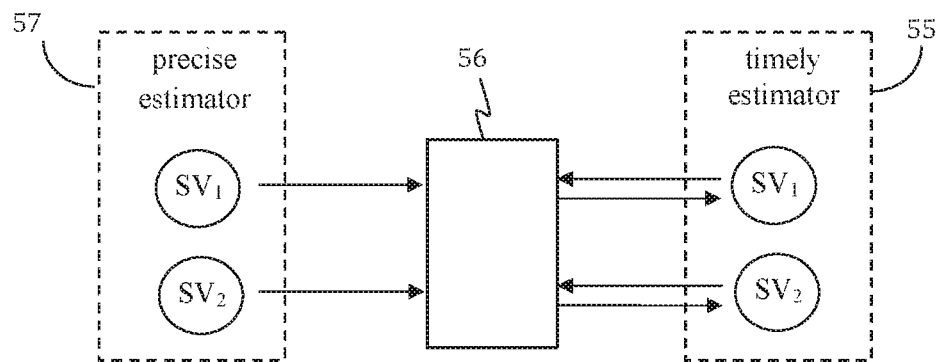
Figure 4E:
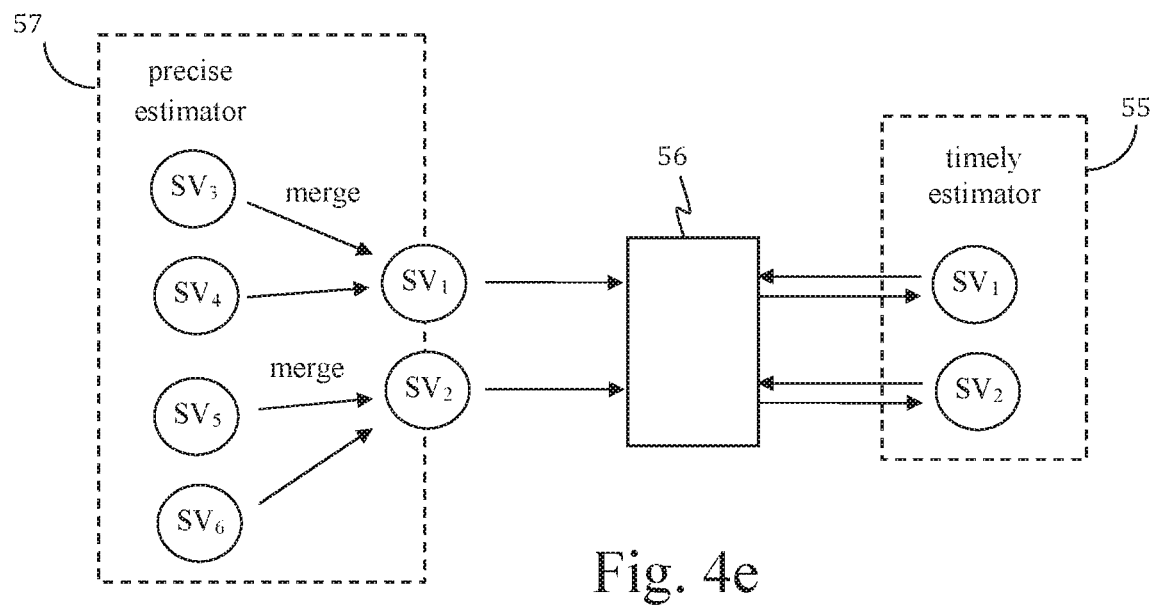

The operation consisting in computing the value of a composite state variable from the value of its component state variables may be regarded as assembling the composite state variable as a merger of its components (as illustrated further with reference to FIGS. 4b and 4e). Precise estimator 57 may maintain all the reset-designated state variables implicitly (meaning that none of them are maintained explicitly), only one or some of them implicitly (the other(s) being maintained explicitly), or none of them implicitly (meaning that all of them are maintained explicitly).

In one embodiment, the values of the reset-designated state variables and the covariances associated therewith, as computed by timely estimator 55, are recurrently replaced s140, in timely estimator 55, with the values of the corresponding reset-designated state variables and associated covariances computed by precise estimator 57. In another embodiment, the values of the reset-designated state variables and the covariances associated therewith, as computed by timely estimator 55, are recurrently replaced s140, in timely estimator 55, with values computed based on the values of some of the state variables and associated covariances computed by precise estimator 57. In yet another embodiment, the values of the reset-designated state variables and the covariances associated therewith, as computed by timely estimator 55, are recurrently replaced s140, in timely estimator 55, with values of the corresponding reset-designated state variables computed and associated covariances based on: the values of some of the state variables and associated covariances computed by timely estimator 55 and the values of some of the state variables and associated covariances computed by precise estimator 57. These three embodiments involving the covariances associated with the reset-designated state variables show that, depending on the type of filter(s), some filter-specific operations may also be necessary as part of the recurring replacement operation s140. For example, a federated filter typically requires the estimation error covariance components corresponding to the reset-designated common states to be replaced as well.

In one embodiment, a federated filter is defined as a Carlson federated filter comprising a plurality of Kalman filters as local filters, and a collator, as explained in section J.1 below.

Figure 10:
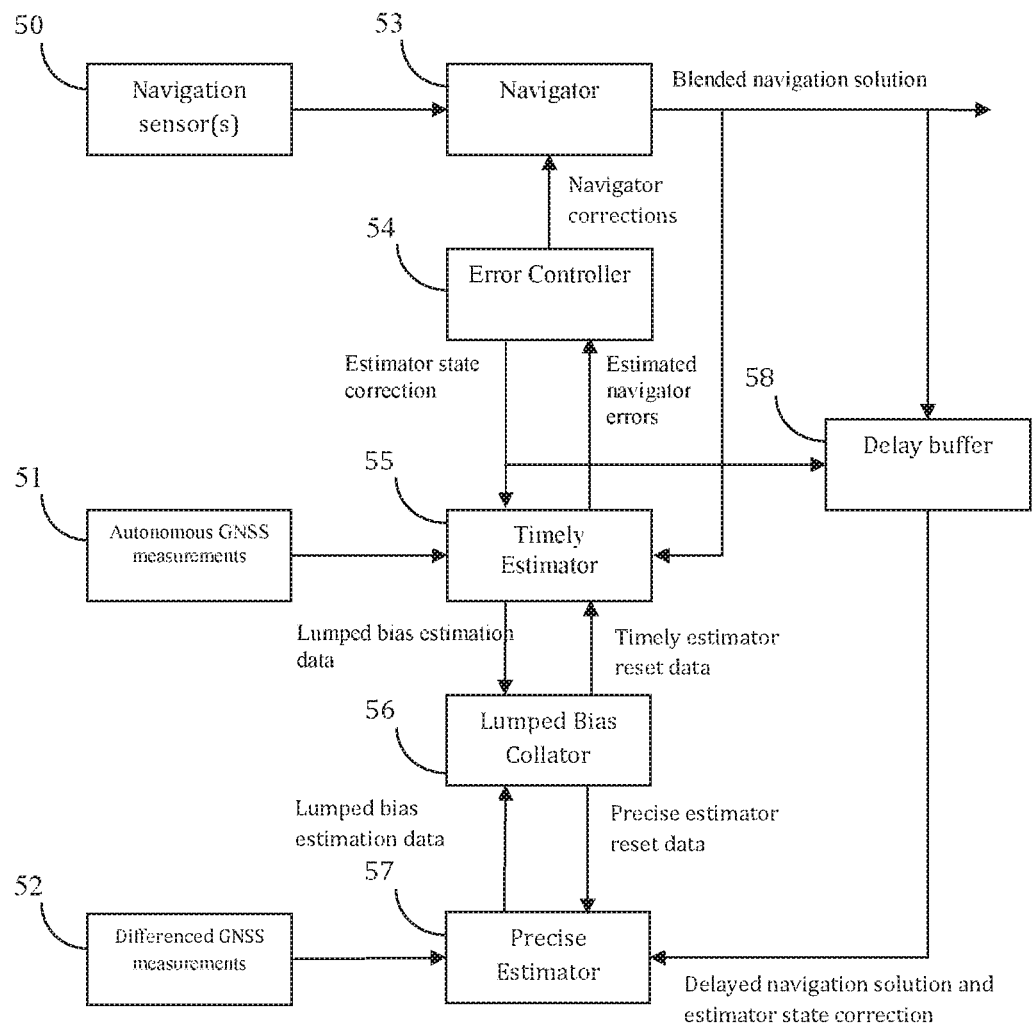
FIGS. 10 and 11 schematically illustrate two aided navigator architectures with delayed estimation in two embodiments of the invention.
Figure 11:
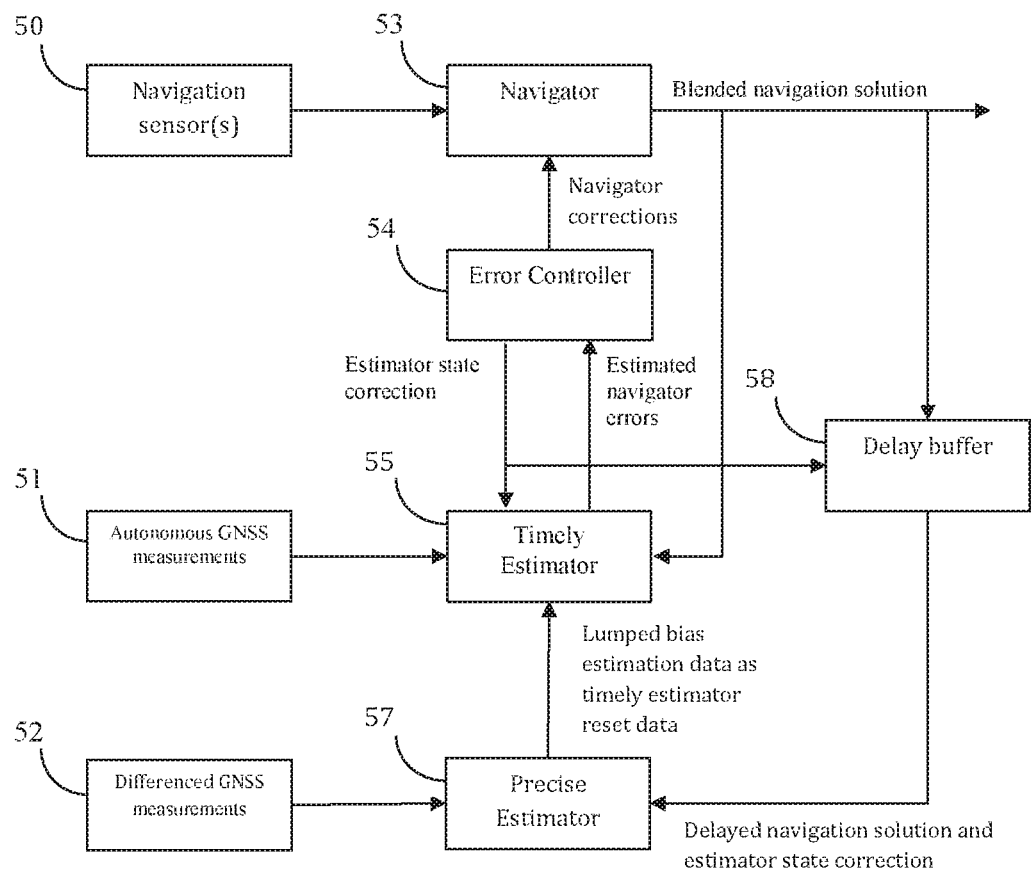

Method 100 may for example output a position solution (or navigation solution) provided by timely estimator 55, including parameters to determine a position, or estimated errors that may be used by (an)other filter(s), unit(s) or entity(ies) to determine a position (as illustrated for example by FIGS. 10 and 11, showing "estimated navigator errors" output by timely estimator 55). For example, method 100 may be carried out by a NSS receiver operating an ANS-GNSS system, i.e. an aided navigation system (ANS) aided with data from a GNSS receiver, and, in that framework, timely estimator 55 may provide estimated errors to another entity such as, for example, (i) an inertial navigator of the AINS-GNSS system, in which the inertial navigator processes inertial data from an inertial measurement unit (IMU), (ii) a DMI navigator of the ANS-GNSS system, or (iii) a vision navigator of the ANS-GNSS system. Such navigators incur navigation errors during normal operation, which may be estimated by timely estimator 55 operating together with precise estimator 57.

FIGS. 2a to 2d schematically illustrate the architecture of methods in four embodiments of the invention, which may be regarded as exemplary ways of implementing the method described with reference to FIG. 1.

Figure 2A:
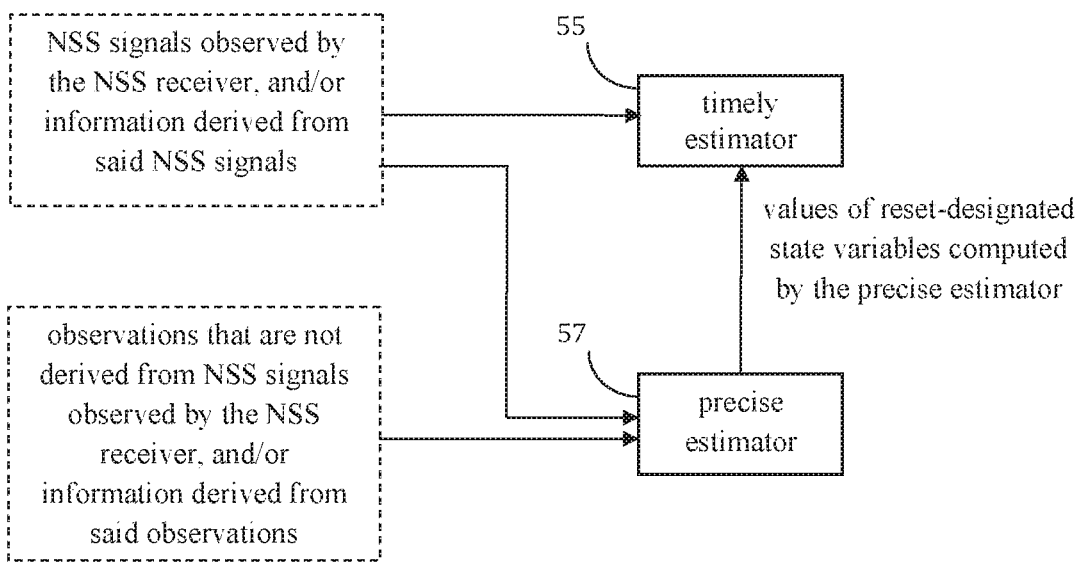
FIGS. 2a to 2d schematically illustrate the exemplary architecture of methods in four embodiments of the invention.

In FIG. 2a, the values of the reset-designated state variables computed by timely estimator 55 are recurrently replaced s140, in timely estimator 55, with the values of the corresponding reset-designated state variables computed by precise estimator 57, as illustrated by the arrow from precise estimator 57 to timely estimator 55. Furthermore, as schematically illustrated by the arrow reaching timely estimator 55 from the left, timely estimator 55 computes the values of its state variables (i.e., of both its unique state variables and, if any, the common state variables) based on NSS signals observed by the NSS receiver, and/or information derived from said NSS signals (i.e. based on what may be referred to as "autonomous NSS measurements"). In contrast, as schematically illustrated by the two arrows reaching precise estimator 57 from the left, precise estimator 57 computes the values of its state variables (i.e., of both its unique state variables and, if any, the common state variables) not only based on NSS signals observed by the NSS receiver, and/or information derived from said NSS signals, but also based on observations that are not derived from NSS signals observed by the NSS receiver, and/or information derived from said observations.

Figure 2B:
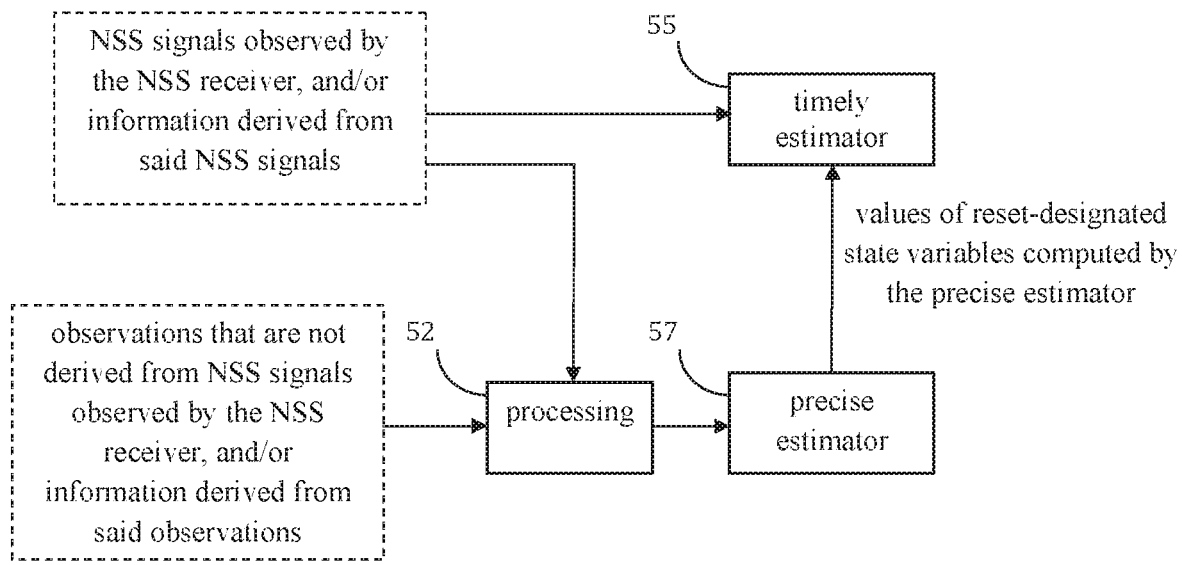

FIG. 2b schematically illustrates the architecture of a method which differs from the method illustrated by FIG. 2a in that, as schematically illustrated by the text box 52 labelled "processing" and the single arrow reaching precise estimator 57 from the left, precise estimator 57 computes the values of its state variables based on information derived from both NSS signals observed by the NSS receiver and observations that are not derived from NSS signals observed by the NSS receiver. In one embodiment, precise estimator 57 computes the values of its state variables based on differences between NSS observations made based on the NSS signals observed by the NSS receiver, and the NSS observations from at least one reference receiver. In other words, differenced GNSS measurements are used in this embodiment.

Figure 2C:
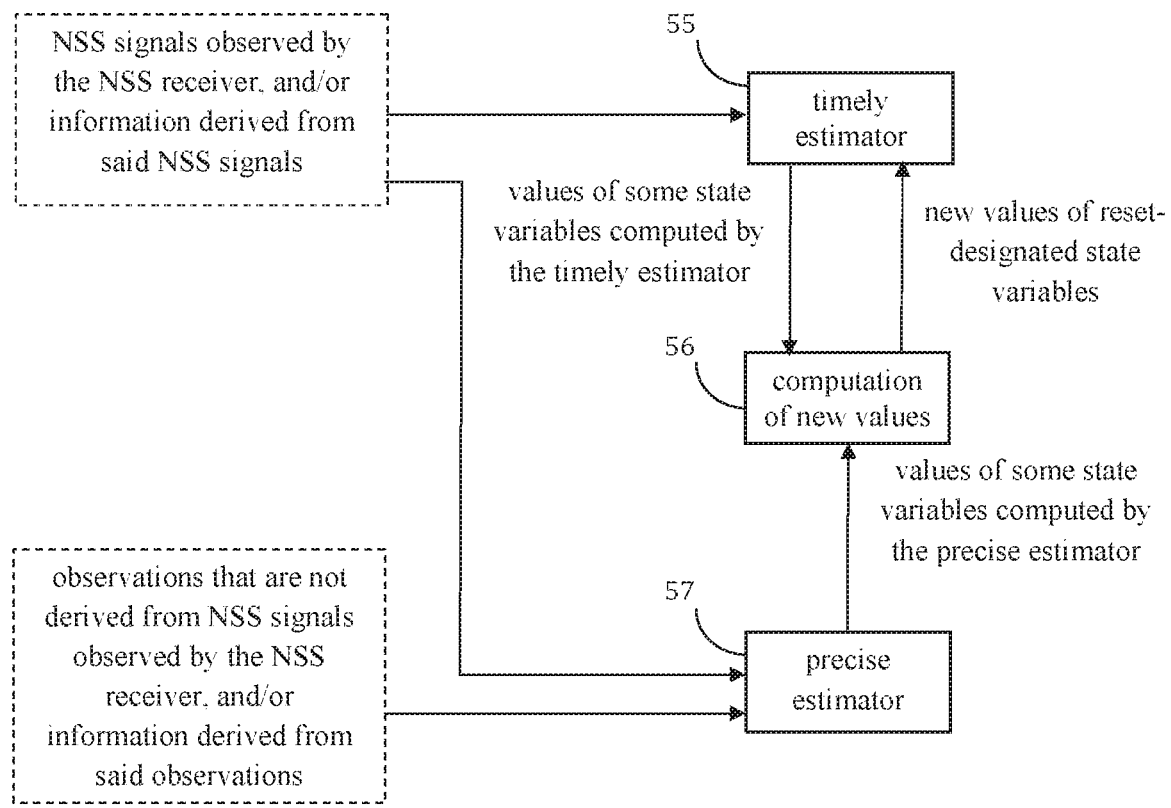

In FIG. 2c, the values of the reset-designated state variables computed by timely estimator 55 are recurrently replaced s140, in timely estimator 55, with values of the corresponding reset-designated state variables computed, as illustrated by the text box labelled "computation of new values", based on: the values of some of the state variables computed by timely estimator 55 (including, or being, the values of the reset-designated state variables computed by timely estimator 55) and the values of some of the state variables computed by precise estimator 57 (including, or being, the values of the reset-designated state variables computed by precise estimator 57). In one embodiment, the text box labelled "computation of new values" comprises a collator 56 of a federated filter. In other words, in that embodiment, the values of the reset-designated state variables computed by timely estimator 55 are recurrently replaced s140, in timely estimator 55, with values computed by a collator 56 of a federated filter based on: the values of some of the state variables computed by timely estimator 55 (including, or being, the values of the reset-designated state variables computed by timely estimator 55) and the values of some of the state variables computed by precise estimator 57 (including, or being, the values of the reset-designated state variables computed by precise estimator 57).

Figure 2D:
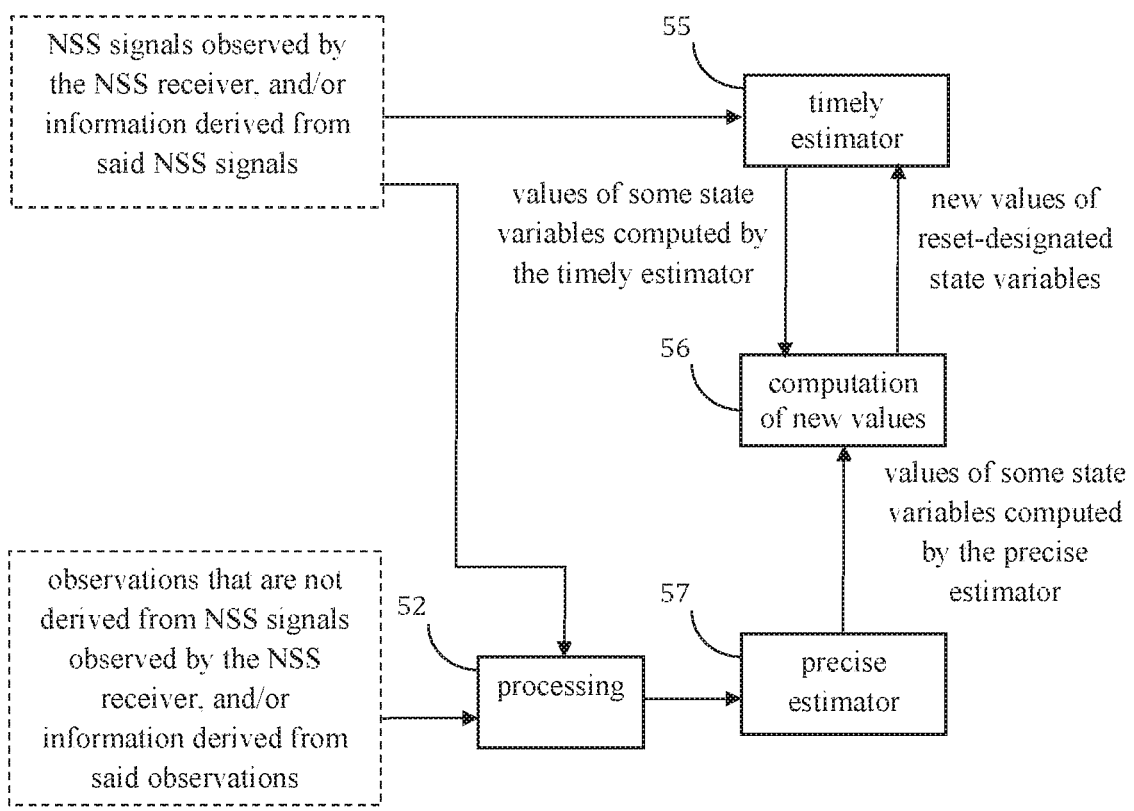
Figure 3A:
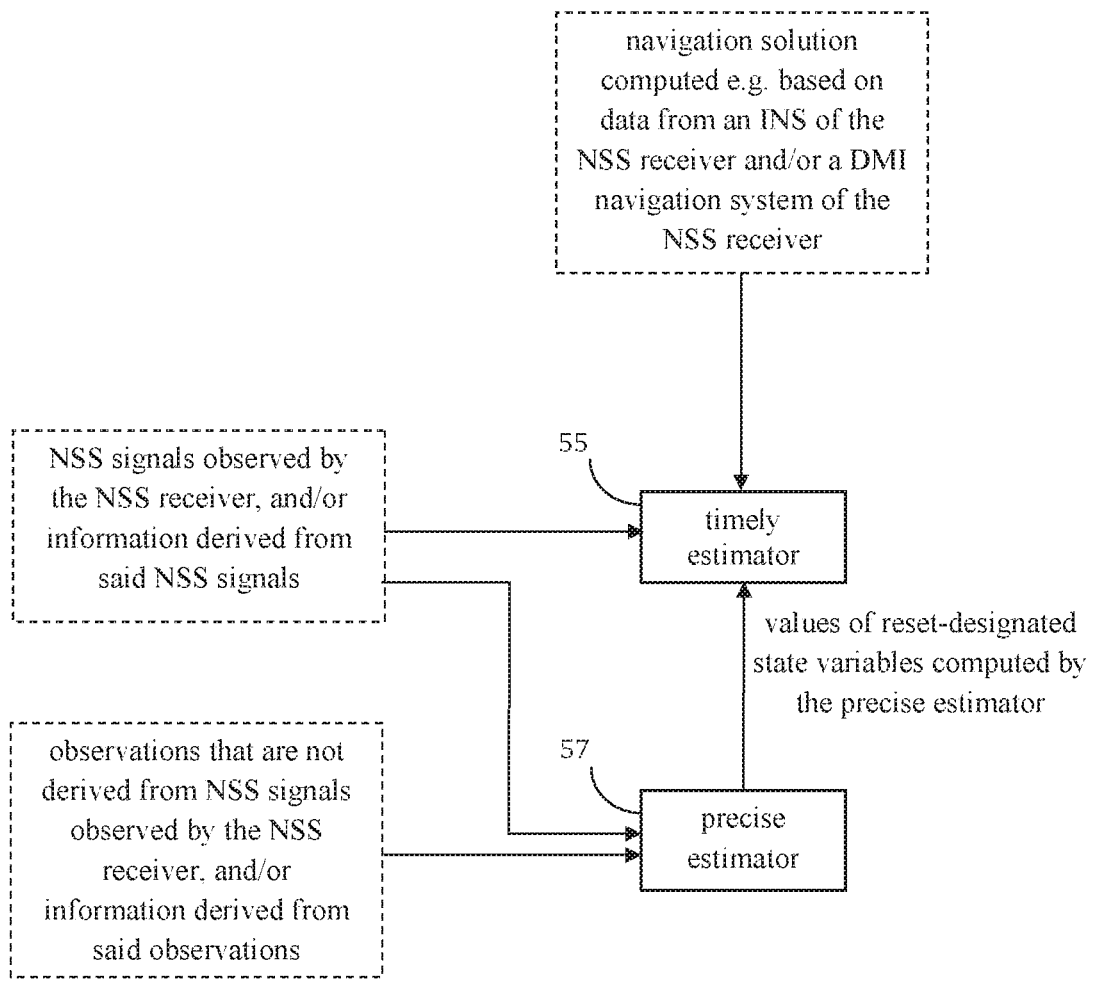
FIGS. 3a to 3d schematically illustrate the exemplary architecture of methods in four further embodiments of the invention, wherein the timely estimator computes the values of its state variables further based for example on a navigation solution computed based on data from an inertial navigation system (INS) of, or connected to, the NSS receiver and/or a distance measurement instrument (DMI) navigation system of, or connected to, the NSS receiver.
Figure 3B:
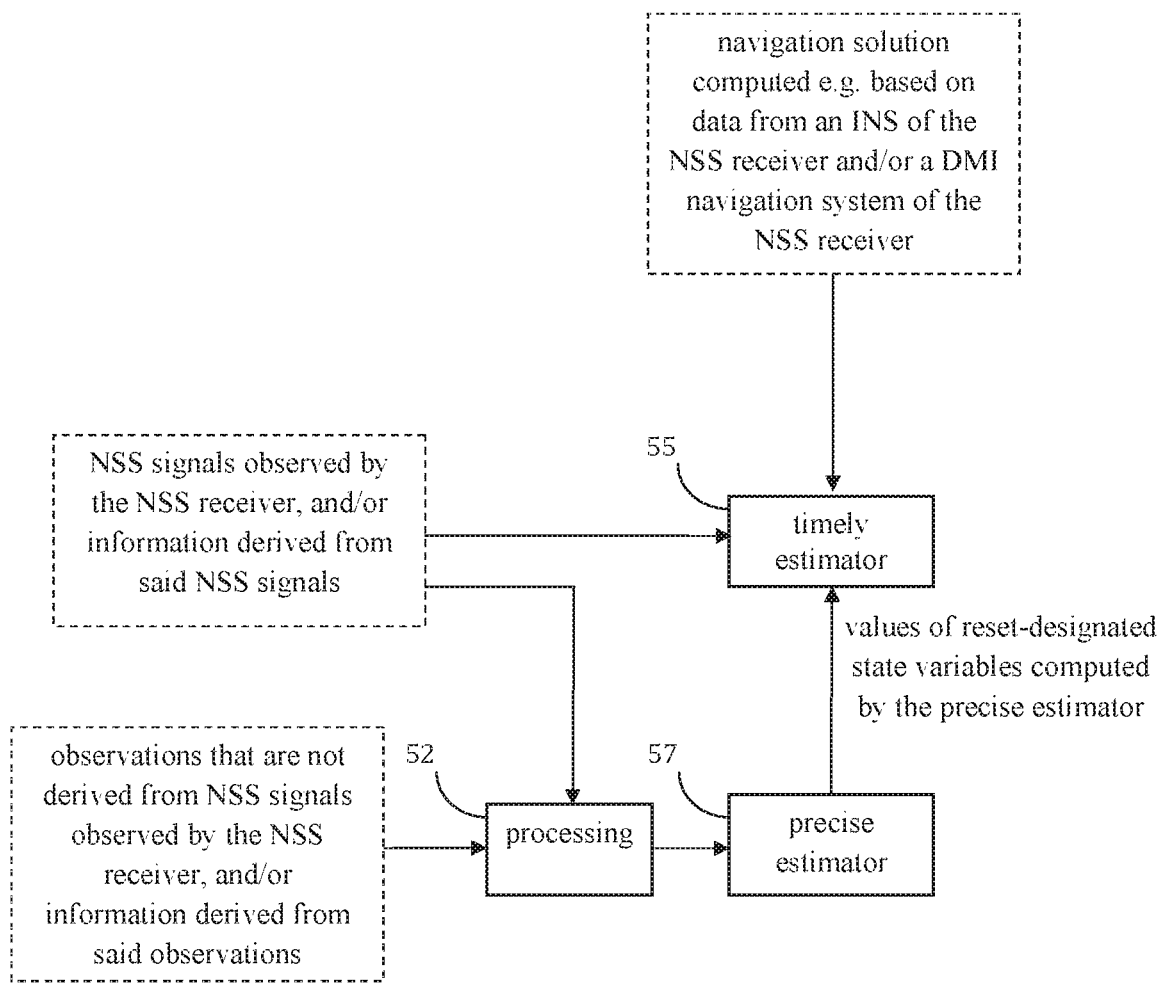
Figure 3C:
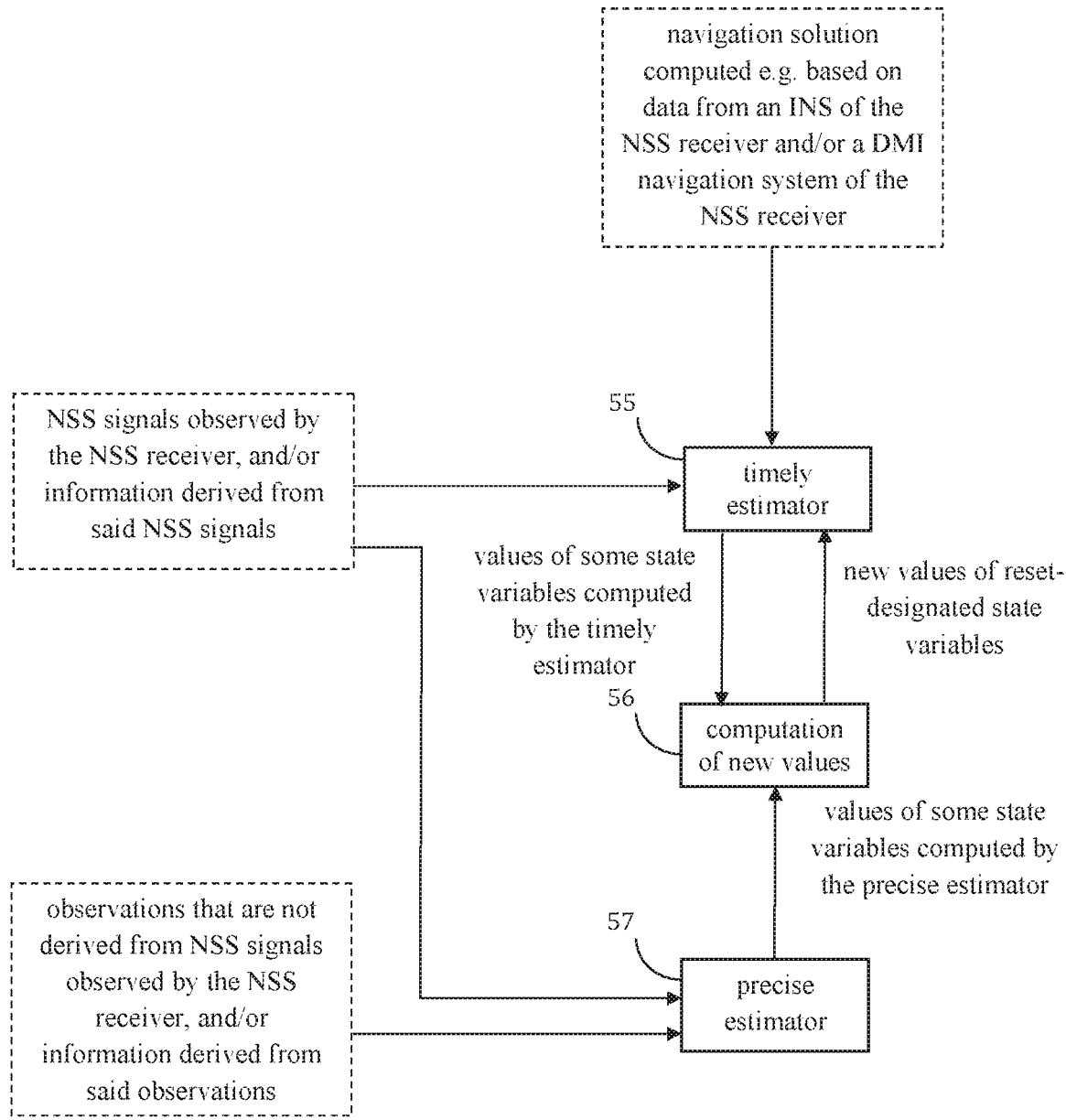
Figure 3D:
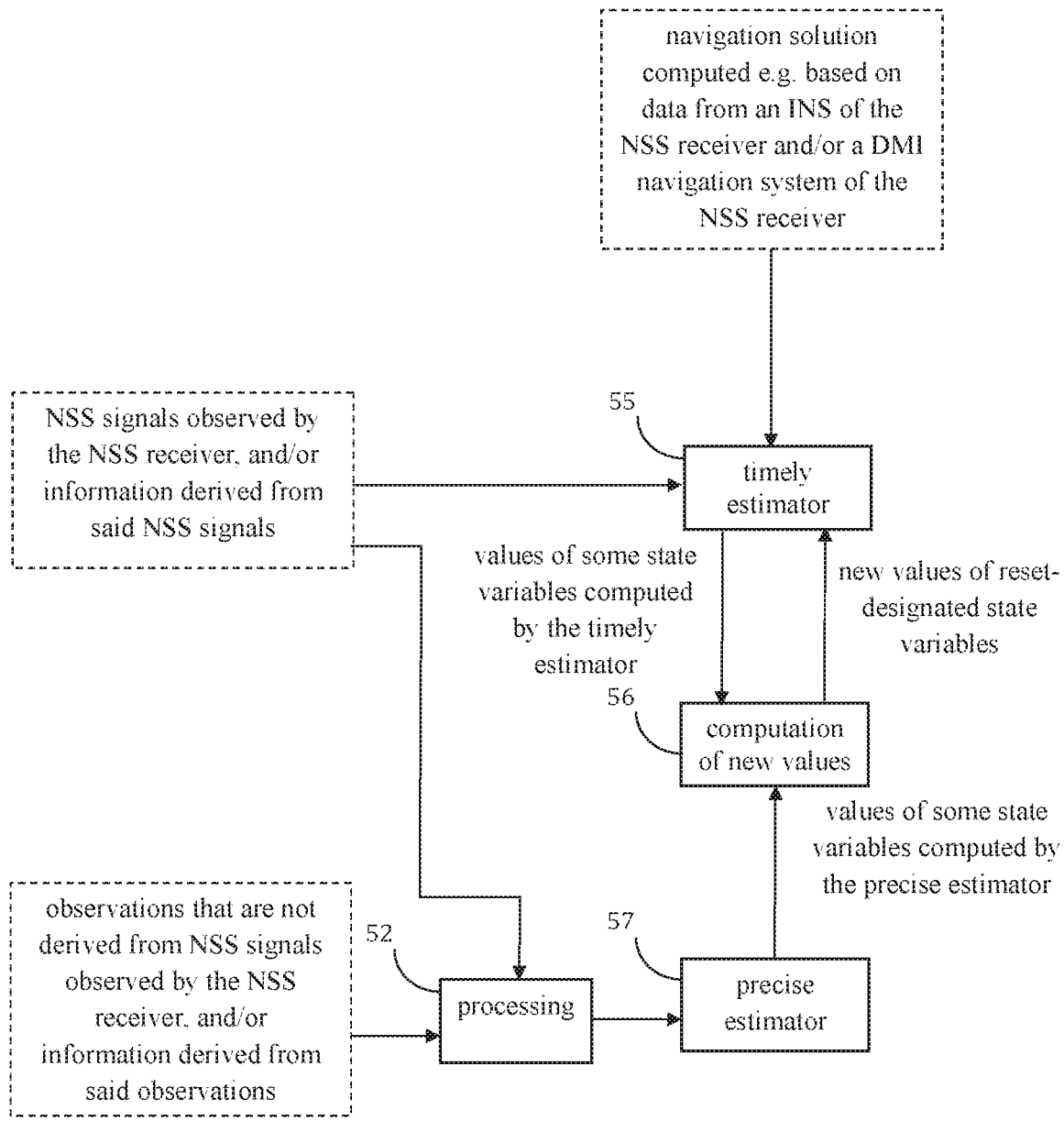

FIG. 2d schematically illustrates the architecture of a method combining the features of the methods of FIGS. 2b and 2c.

FIGS. 3a to 3d schematically illustrate the architecture of methods in four embodiments of the invention, which differ from the embodiments described with reference to FIGS. 2a to 2d in that timely estimator 55 computes the values of its state variables (i) not only based on NSS signals observed by the NSS receiver, and/or information derived from said NSS signals, as explained notably with reference to FIG. 1, i.e. not only based on what may be referred to as "autonomous NSS measurements", (ii) but also based on a navigation solution computed for example based on data from an INS of the NSS receiver, and/or data from a DMI navigation system of the NSS receiver. For example, method 100 may be carried out by a NSS receiver operating an ANS-GNSS system, and, in that framework, timely estimator 55 may receive input data from another entity such as (a) an inertial navigator of an AINS-GNSS system, in which the inertial navigator processes inertial data from an IMU, (b) a DMI navigator of the ANS-GNSS system, or (c) a vision navigator of the ANS-GNSS system.

Thus, timely estimator 55 processes timely aiding data that include (i) what has been referred to above as "autonomous GNSS measurements", and (ii) non-GNSS data associated with the above-referred navigation solution. Timely estimator 55 can typically not achieve precise estimation on its own, because of the non-precise aiding data available to it. In contrast, precise estimator 57 processes rover and reference GNSS measurements and thereby can achieve precise estimation of the values of the reset-designated state variables using RTK techniques that include for example floated ambiguity estimation. The precision may be further enhanced by a carrier phase integer ambiguity search and validation process that imposes an integer constraint on the floated ambiguities and a corresponding adjustment of the estimated values of the reset-designated state variables.

FIGS. 4a to 4f schematically illustrate how the transfer of accuracy from precise estimator 57 to timely estimator 55 may take place, in six embodiments of the invention, where, merely by way of example, a) only two state variables are shown to be transferred to timely estimator 57, and b) state variables that are unique to each of the two estimators and are not used as component state variable of a composite state variable are not shown.

In the embodiment illustrated by FIG. 4a, the value of each of state variables $SV_1$ and $SV_2$ computed by timely estimator 55 are recurrently replaced, in timely estimator 55, with the respective value of the corresponding state variable $SV_1$, $SV_2$ computed by precise estimator 57. In that case, state variables $SV_1$ and $SV_2$ are reset-designated common state variables. They are explicitly maintained by precise estimator 57.

In the embodiment illustrated by FIG. 4b, the value of state variable $SV_1$ computed by timely estimator 55 is recurrently replaced, in timely estimator 55, with a respective value (of $SV_1$) computed based on the values of state variables $SV_3$ and $SV_4$ that are computed by precise estimator 57, whereas the value of state variable $SV_2$ computed by timely estimator 55 is recurrently replaced with a respective value (of $SV_2$) computed based on the values of state variables $SV_5$ and $SV_6$ that are computed by precise estimator 57. In that case, state variables $SV_1$ and $SV_2$ are reset-designated state variables, which may either be explicitly or implicitly maintained by precise estimator 57. State variables $SV_3$, $SV_4$, $SV_5$, and $SV_6$ are explicitly maintained by precise estimator 57.

In the embodiment illustrated by FIG. 4c, the value of state variable $SV_1$ computed by timely estimator 55 is recurrently replaced, in timely estimator 55, with a respective value ($SV_1$) computed based on the values of state variables $SV_3$ and $SV_4$ computed by precise estimator 57, whereas the value of state variable $SV_2$ computed by timely estimator 55 is recurrently replaced with the value of state variable $SV_2$ computed by precise estimator 57. In that case, state variables $SV_1$ and $SV_2$ are reset-designated state variables, state variable $SV_1$ may either be explicitly or implicitly maintained by precise estimator 57, and state variables $SV_2$, $SV_3$, and $SV_4$ are explicitly maintained by precise estimator 57.

Figure 4F:
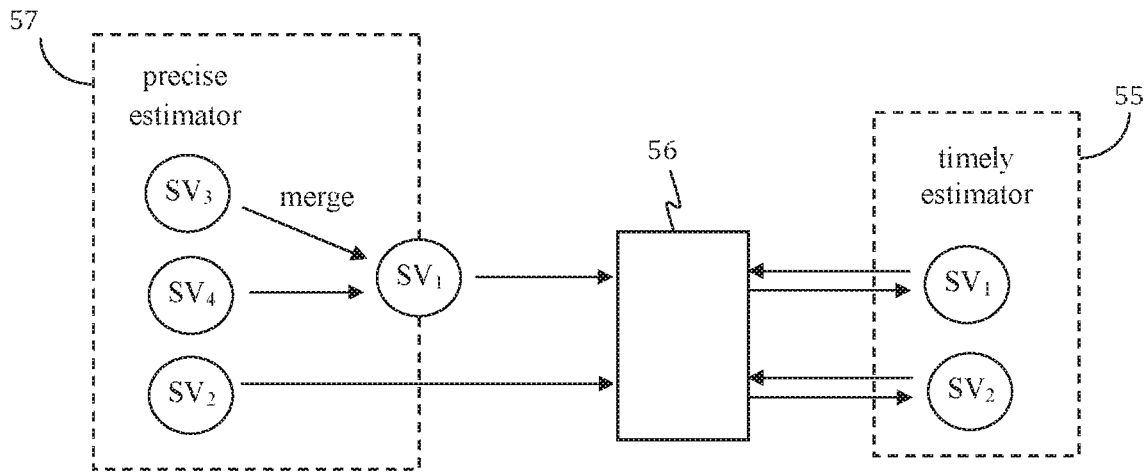

The embodiments illustrated by FIGS. 4d to 4f respectively differ from those illustrated by FIGS. 4a to 4c in that the values of the reset-designated state variables $SV_1$ and $SV_2$ computed by timely estimator 55 are recurrently replaced s140, in timely estimator 55, with values of the corresponding reset-designated state variables computed, as illustrated by the box with reference "56", based on: the values of state variables $SV_1$ and $SV_2$ computed by timely estimator 55 and the values of state variables $SV_1$ and $SV_2$ computed by precise estimator 57 (in a similar manner as discussed with reference to FIGS. 2c, 2d, 3c, and 3d). Box 56 may for example represent a collator of a federated filter.

As mentioned above, precise estimator 57 is delayed by at least one receiver epoch with respect to timely estimator 55.

In one embodiment, the delay between the estimators is a value (corresponding to an integer number of receiver epochs) comprised between 5 and 60 seconds, preferably a value comprised between 15 and 45 seconds, such as for example about 30 seconds. The maximum theoretical delay involving most NSS satellites may be limited in some embodiments by the visibility of a satellite whose biases is being used as part of the reset-designated state variables. Since a NSS with geostationary satellites (e.g., QZSS, BeiDou) may provide indefinite satellite visibility, the delay between the estimators is not necessary upper-bounded.

Furthermore, the delay between the estimators may be configured to be variable in runtime. It is for example common for there to be a variable time delay in reception of reference station corrections. If the corrections are delivered over the internet, reference station correction data packets (or the like) may arrive with delays of 1 to 20 seconds. Thus, correction information provided by a network of reference stations to precise estimator 57 may often have a variable delay. The total delay in the transmission of the correction information may for example include the following components:

a) Formation of GNSS measurements in each reference station;
b) Encoding of GNSS measurements by each reference station;
c) Transmission of encoded reference station measurements to a server;
d) Decoding of reference station measurements at the server;
e) Computation of satellite and atmospheric error models;
f) Encoding of network correction messages for users;
g) Transmission of network correction messages via: wireless internet, radio data link, and/or satellite data link, etc;
h) Decoding of network correction messages at user equipment;
i) Input of correction information to precise estimator.

As mentioned above, the reset-designated state variables may be chosen e.g. by virtue of having, or being expected to have, predictable behaviour over the time interval by which precise estimator 57 is delayed with respect to timely estimator 55.

In one embodiment, the set of reset-designated state variables may be changed in runtime depending for example on the delay with which the correction information is received, the content of the available correction information, and/or the environment (e.g., the receiver behaviour and/or receiver environment). Changing the set of reset-designated state variables in runtime may be advantageous considering the stochastic behavior of the state variables that can be chosen from as reset-designated state variables (i.e., either (i) common state variables, or (ii) state variables of timely estimator 55 that are composite state variables of precise estimator's 57 state variables).

Table 1 shows the typical stochastic behavior of error sources. For a given error budget and considering for example the delay with which the correction information is received, it is then possible to change the selection of reset-designated state variables.

TABLE 1

Typical stochastic behavior of some error sources.

| State variable (being a candidate to be chosen as reset-designated state variable) | Typical error growth |
| --- | --- |
| ionospheric bias | 0.5 mm/s at zenith |
| tropospheric bias | 0.01 mm/s at zenith |
| satellite orbital bias | 0.1 mm/s |
| satellite clock error | 0.5 mm/s |
| carrier phase ambiguity | 0.0 (random constant) |
| carrier phase multipath | Gauss-Markov process (correlation time: about 30 s; zenith correlated variance: about 0.002 mm) |

Before discussing further embodiments of the invention, let us now further explain, in sub-sections A to J.5 below, the context in which some embodiments of the invention have been developed, for a better understanding thereof, as well as some technical considerations that may be helpful for understanding some embodiments of the invention and problems addressed by these embodiments.

A. Notation

The description that follows provides a number of equations in which, by way of example, the following notation $\vec{x}$ denotes a vector with no specific reference frame of resolution. The notation $\vec{x}^a$ denotes a vector resolved in a coordinate frame called the a-frame. All coordinate frames are right-handed orthogonal frames. The X-Y-Z axes form an orthogonal triad in the forward, right and down directions. Typical coordinate frames of interest are the geographic frame (g-frame) whose principal axes coincide with the North, East and Down directions, and the inertial sensor body frame (b-frame), whose principal axes coincide with the input axes of the inertial sensors of an INS or aided INS.

Subscripts on vectors are used to indicate a particular property or identification of the vector. For example, $\vec{l}_{sa}^{\,b}$ is a lever arm vector from an INS sensor frame (s-frame) origin to the GNSS antenna frame (a-frame) resolved in the INS body (b-frame) frame coordinates.

Continuous time dependency of a quantity is indicated with round brackets around a time variable. For example, $\vec{x}^a$ (t) denotes the value of the vector $\vec{x}^a$ at time t.

Discrete time dependency of a quantity is indicated with round brackets around an integer iteration index or count. For example, $\vec{x}^a$ (k) denotes the value of the vector $x^a$ at iteration k.

The small hat above the vector $\hat{\vec{x}}$ implies that the vector $\vec{x}$ is approximately but not exactly known. It can be an estimate of $\vec{x}$ generated by an estimation process such as a least-squares adjustment or Kalman filter. A superscript—on a vector $\vec{x}$ to yield $\vec{x}^-$ indicates an a priori estimate of $\vec{x}$, which is the estimate or best guess of $\vec{x}$ before the occurrence of an estimation process (such as for example a Kalman filter measurement or observation update) involving new information that makes the estimate more accurate. A superscript + on a vector $\vec{x}$ to yield $\vec{x}^+$ indicates an a posteriori estimate of $\vec{x}$, which is the output of an estimation process involving new information that makes the estimate more accurate.

B. GNSS

As mentioned in the above "Background" section, Global Navigation Satellite Systems (GNSS) consist of constellations of earth orbiting satellites, whereby each satellite broadcast signals towards the earth for the purposes of enabling users to obtain their location and time with respect to well-known reference systems. There are currently six GNSS in use, including: GPS, GLONASS, Galileo, BeiDou, QZSS, and IRNSS. In total there are approximately 100 satellites in space at present, in a variety of configurations including satellites in: Medium Earth Orbit (MEO), Geostationary (GEO), and Inclined Geosynchronous (IGEO) orbits. Each satellite broadcasts code-based timing signals, modulated on one or more carrier frequencies. Satellites also provide data messages that contain predicted ephemeris information describing the expected orbital location and satellite clock behavior as a function of time. A GNSS receiver uses signals received from satellites to compute a position fix including an accurate estimate of time and velocity every receiver epoch. A typical receiver epoch is one second, but may as well be a value comprised between 10 and 200 ms (corresponding therefore to a frequency value comprised between 5 to 100 Hz) depending on the receiver design.

A GNSS receiver typically outputs navigation data comprising time, position and velocity every receiver epoch. Some GNSS receivers also output channel data for each tracked satellite comprising: pseudoranges, carrier phases and Doppler observations for one or more of the frequency band and code modulation broadcast by the satellite. These are referred to here as "measurement data" or simply "measurements". Reference [6] provides descriptions about some GPS and GPS receivers.

C. GNSS Positioning

An autonomous GNSS position solution is typically computed from the code phase (also called pseudorange) data and carrier phase data generated by a single GNSS receiver, called the rover receiver. The accuracy of such a position solution is dependent on the number of satellites used in the solution and their relative positions as measured in the position dilution of precision (PDOP). The best achievable position accuracy without augmentation of the receiver-generated measurements is generally on the order of 3 meters. Such a position is generally said to be non-precise. Autonomous GNSS position accuracy is extensively documented, for example in reference [8].

Various forms of augmentation may be used to attenuate the errors in the code and carrier phase measurements generated by a GNSS receiver and thereby improve the accuracy of the computed GNSS position solution. Such augmentation generally involves using GNSS data from one or more stationary reference receivers that allow for the cancellation or calibration of common mode errors in the measurements such as satellite orbit and clock errors and atmospheric delays. The resulting position solution is the relative position of the rover antenna with respect to a reference antenna position and therefore is said to be a differential GNSS position. The resulting differential position accuracy depends on a number of factors, including the number of reference receivers, the proximity of the reference receiver(s) to the rover receiver, and how the reference receiver data are processed.

A precise position is defined to have a position accuracy that meets an a priori definition of precision. In the context of GNSS positioning, a computed position is generally said to be precise if its 95% position accuracy is 10 centimeters or less. The term "precise GNSS" describes a method of computing a precise relative position of the antenna of a rover GNSS receiver, with respect to the position of the antenna of a reference receiver or network of reference receivers. If the reference receiver antenna's position with respect to the earth is known with the same accuracy, then the computed position of the rover receiver antenna with respect to the earth is also precise.

Precise GNSS is typically implemented using a RTK technique that involves exploitation of the integer nature of the carrier phase ambiguity parameters in the differential carrier phase measurements computed from the rover and reference receivers. This is a form of carrier phase interferometry that has achieved a state of maturity evidenced by the many GNSS survey products that implement some form of precise GNSS. See reference [9] for a description of a precise GNSS methodology that is widely used.

D. Inertial Navigation System

An inertial navigation system (INS) is a navigation instrument that computes its navigation solution by propagating Newton's equations of motion using as inputs measured specific forces or incremental velocities from a triad of accelerometers and measured angular rates or incremental angles from a triad of gyros. A terrestrial INS is designed to navigate on the earth where it is subjected to gravity and earth rate. A celestial INS is designed to navigate in space where it is subjected to smaller gravitational forces from multiple celestial bodies. The present disclosure is concerned only with a terrestrial INS. The qualifier "terrestrial" is hereafter implied but not cited explicitly.

An INS can navigate with a specified accuracy after an initialization of the inertial navigator mechanization during which it determines its initial position, initial velocity and North and down directions to a specified accuracy that is commensurate with its inertial sensor errors. The term "alignment" is used to describe this initialization and any ongoing corrections of the inertial navigator mechanization. A free-inertial INS performs an initial alignment and then propagates its navigation solution with no further corrections. See reference [1] for an overview of an INS. See references [2], [4] or [5] for descriptions of inertial navigator equations and algorithms.

E. Aided INS

An aided INS (AINS) undergoes ongoing corrections to its inertial navigator mechanization to constrain the growth in inertial navigation errors. The AINS uses an error estimator to estimate INS errors and some means of INS error control to correct the INS errors. A so-called "closed-loop AINS" uses the estimated INS errors from the error estimator to correct the inertial navigator mechanization integrators. This causes the INS alignment to be continuously corrected, and as such is a method for achieving mobile alignment.

Figure 5:
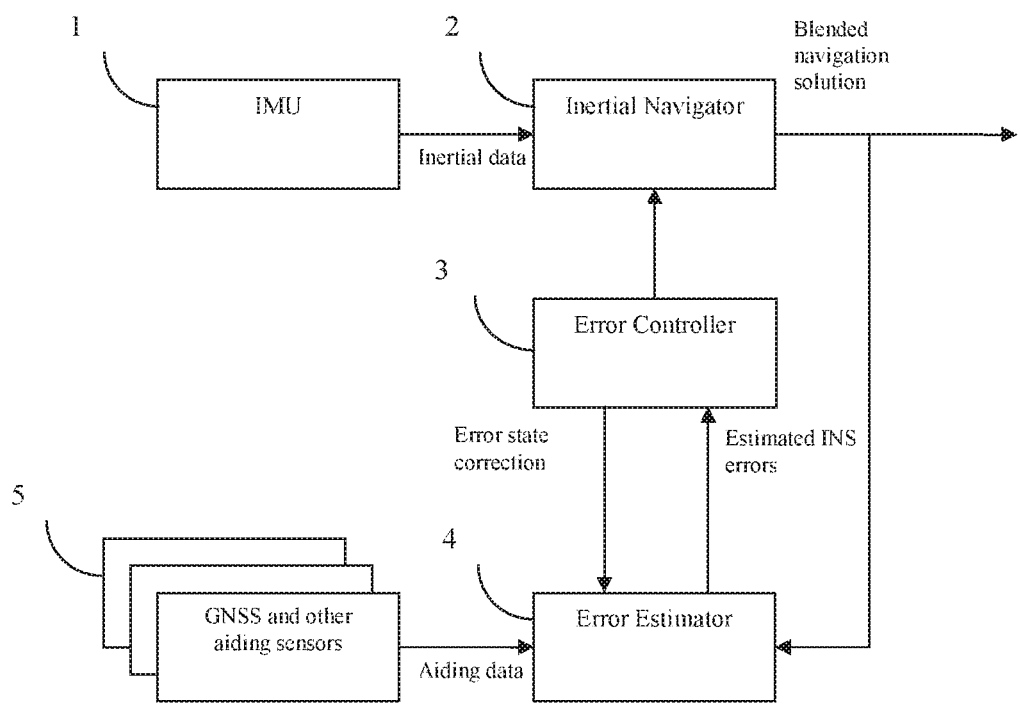
FIG. 5 schematically illustrates a close-loop aided INS architecture for illustrating the context in which some embodiments of the invention have been developed.

FIG. 5 shows a generic closed-loop AINS architecture. The inertial measurement unit (IMU) 1 generates incremental velocities and incremental angles at the IMU sampling rate, typically 50 to 500 samples per second. The corresponding IMU sampling time interval is the inverse of the IMU sampling rate, typically 1/50 to 1/1000 seconds. The incremental velocities are the specific forces from the IMU accelerometers integrated over the IMU sampling time interval. The incremental angles are the angular rates from the IMU gyros integrated over the IMU sampling time interval. See reference [2] for information on inertial sensors and IMU mechanizations. The inertial navigator 2 receives the inertial data from the IMU and computes the current IMU position (typically latitude, longitude, altitude), velocity (typically North, East and Down components) and orientation (roll, pitch and heading) at the IMU sampling rate.

The aiding sensors 5 are any sensors that provide navigation information that is statistically independent of the inertial navigation solution that the INS generates. A GNSS receiver is a widely used aiding sensor.

The error estimator 4 is one of several possible estimation algorithms that compute an estimate of a state vector based on constructed measurements. The error estimator is typically a Kalman filter (see reference [3]), however it can be one of several other types of multivariable estimators that include an unscented Kalman filter (see references [12], [13]), a particle filter (see reference [14]), an M-estimator (of which a least-squares adjustment is a special case; see reference [15] as an example) or a neural network (see reference [16]). The measurements typically comprise computed differences between the inertial navigation solution elements and corresponding data elements from the aiding sensors. For example, an inertial-GNSS position measurement comprises the differences in the latitudes, longitudes and altitudes respectively computed by the inertial navigator and a GNSS receiver. The true positions cancel in the differences, so that the differences in the position errors remain. An error estimator designed for integration of an INS and aiding sensors typically estimates the errors in the INS and aiding sensors. The INS errors typically comprise the following:

Inertial North, East and Down position errors
Inertial North, East and Down velocity errors
Inertial platform misalignment errors
Accelerometer biases
Gyro biases GNSS errors may include the following:
North, East and Down position errors
Receiver clock offset and drift
Carrier phase ambiguities
Atmospheric range errors
Multipath errors
Antenna phase center errors Reference [3] provides a relatively comprehensive treatment of Kalman filtering. It also contains the aided INS as an example application. Reference [4] provides a detailed analysis of different INS error models that may be used in an AINS Kalman filter.

The error controller 3 computes a vector of resets from the INS error estimates generated by the error estimator and applies these to the inertial navigator integration processes, thereby regulating the inertial navigator errors in a closed-loop error control loop. This causes the inertial navigator errors to be continuously regulated and hence maintained at significantly smaller magnitudes that an uncontrolled or free-inertial navigator would be capable of.

Figure 6:
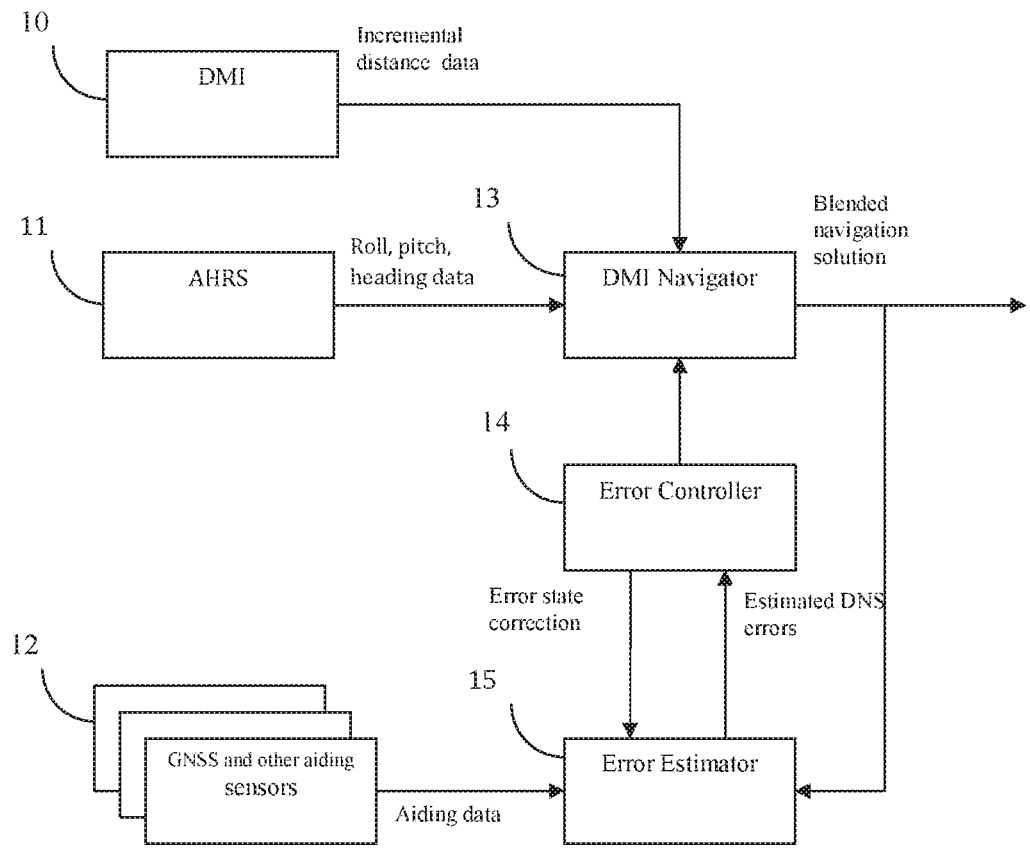
FIG. 6 schematically illustrates a close-loop aided DMI navigation system (DNS) architecture for illustrating the context in which some embodiments of the invention have been developed.

The technology of aided inertial navigation originated in the late 1960's, and found application within military navigation systems. Since then, much research has been conducted and much literature has been generated on the subject. An example of a book on the subject is reference [1]. The equivalent of FIG. 5 is shown in FIG. 6-2 in reference [1], page 273. See also reference [4] for a relatively comprehensive treatment of the mathematics of aided INS.

F. DMI Navigation System

A distance measurement instrument (DMI) is any instrument that measures the distance travelled by a terrestrial vehicle. A wheel odometer is an example of a DMI. Other examples include an optical odometer that measures the three-dimensional displacement of the vehicle using an image processing algorithm operating on a video stream from a camera.

A DMI navigation system (DNS) contains one or more DMIs, an attitude and heading reference system (AHRS) that measures the roll, pitch and heading of the vehicle with respect to a geographic navigation frame, and a computer subsystem that implements the DNS algorithm. Such an algorithm transforms the distance increments measured by the DMI in the vehicle coordinate frame into the geographic navigation frame and then sums the transformed distance increments to obtain the position of the vehicle with respect to a starting position. The computed position may be cast into any of the traditional formats, such as geographic coordinates comprising latitude, longitude and altitude or Cartesian coordinates comprising X, Y and Z components in an earth fixed coordinate frame.

G. Aided DNS

An aided DNS (ADNS) undergoes ongoing corrections to its DNS to constrain the growth in DMI navigation errors. The ADNS uses an error estimator to estimate DNS errors and some means of DNS error control to correct the DNS errors. A so-called "closed-loop ADNS" uses the estimated DNS errors from the error estimator to correct the inertial navigator mechanization integrators.

FIG. 6 shows a generic closed-loop ADNS architecture. The DMI 10 generates incremental distances at the DMI sampling rate, typically 10 to 200 samples per second or one sample every 1/10 to 1/200 seconds. The attitude and heading reference system (AHRS) 11 computes roll, pitch and heading using its internal sensors that typically include an IMU and a heading sensor such as a magnetic compass. See reference [17] for an example of an AHRS mechanization. The DMI navigator 13 receives the DMI data and AHRS data and updates the current vehicle position by transforming the distance increment resolved in the vehicle frame to the navigation frame using the roll, pitch and heading from the AHRS and then adding the transformed distance increment to the current position.

The aiding sensors 12 are any sensors that provide navigation information that is statistically independent of the DMI navigation solution that the DNS generates. A GNSS receiver is a widely used aiding sensor.

The error estimator 15 is, as described previously, one of several possible estimation algorithms that computes an estimate of a state vector based on constructed measurements. The measurements typically comprise computed differences between the DMI position solution and the GNSS position solution. The true positions cancel in the differences, so that the differences in the position errors remain. An error estimator designed for integration of a DNS and aiding sensors typically estimates the errors in the DNS and aiding sensors. The DNS errors typically comprise the following:

DNS North, East and Down position errors
AHRS attitude errors
DMI scale error

The same GNSS errors mentioned previously in the context of the AINS description occur here as well and need to be modeled in the estimator.

The error controller 14 computes a vector of DMI navigator corrections from the DNS error estimates generated by the error estimator and applies these to the DMI navigator state, thereby regulating the DMI navigator errors in a closed-loop error control loop. This causes the DMI navigator errors to be continuously regulated and hence maintained at significantly smaller magnitudes that an uncontrolled DMI navigator would be capable of.

H. Aided GNSS Navigator

Figure 7:
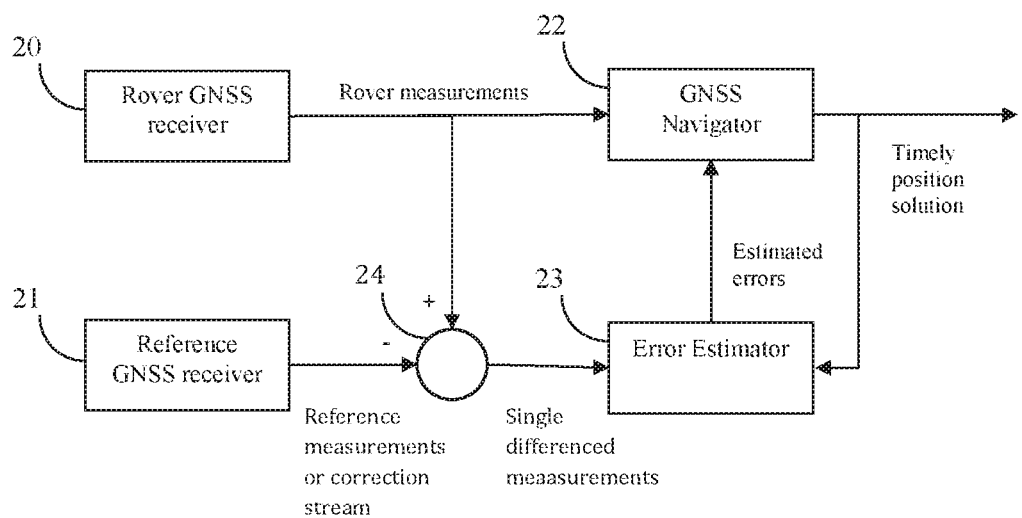
FIG. 7 schematically illustrates an aided GNSS navigator architecture for illustrating the context in which some embodiments of the invention have been developed.

An aided GNSS navigator is a partition of a GNSS position estimator into a GNSS navigator and an error estimator. FIG. 7 shows an exemplary architecture thereof. The GNSS navigator 22 propagates a position solution using autonomous measurements from the rover receiver 20, notably carrier phase increments. It runs at the rate at which the rover receiver generates these measurements, which may be as high as 100 Hz in a modern receiver. The error estimator 23 processes single differenced measurements computed by a GNSS data preparation module 21 from the rover and reference 21 receivers. It typically runs at a slower rate than the navigator, on the order of 1 to 5 Hz. It estimates the errors in the GNSS navigator that the navigator uses to correct its position solution.

I. Aided Navigator

The aided INS, aided DNS and aided GNSS navigator are all examples of an aided navigator. They all may have the architecture of an aided navigator shown in FIG. 8.

An aided navigator contains a navigator 32 that propagates a navigation solution using data from one or more navigation sensors 30. The navigation solution comprises position and some or all of the following components of a complete navigation solution:

velocity
attitude or angular position
acceleration
angular rate

Because of errors in the navigation sensor data, the navigation solution is expected to contain errors. The error estimator 34 is a multivariable estimator such as a Kalman filter that is designed to estimate the navigation errors using data from aiding sensors 31 such as one or more GNSS receivers. The achievable estimation accuracy is dependent on a number of factors that include the accuracies of the aiding data, the stochastic models implemented in the error estimator 34 and the stochastic observability of the navigator errors.

An error controller 33 converts the estimated navigator errors to navigator corrections that the navigator 32 uses to correct its navigation solution. The navigator 32, error estimator 34 and error controller 33 form a closed error regulation loop that regulates the navigation solution error to an accuracy that is consistent with the estimation accuracy achieved by the error estimator 34.

The stability of the closed loop depends in part on the timeliness of the error estimator that in turn depends on the timeliness of the aiding sensor data. It is well known that a feedback loop of any kind may be de-stabilized by sufficiently large signal delays in the closed loop. The magnitude of such delays that de-stabilize the closed loop depend on a number of factors that can be characterized with a stability analysis of the closed loop using well known practices from the field of estimation and control (reference [18]). Typical delays that lead to loop instability in an AINS are in the order of a few seconds.

J. Federated Filter

J.1 Architecture and Data Flow

A federated filter is a partition of a single Kalman filter into multiple local filters and a collator. The method was first reported by Carlson (examples are references [10] and [11]). The generalized federated filter can contain an arbitrary number of local filters.

Figure 9:
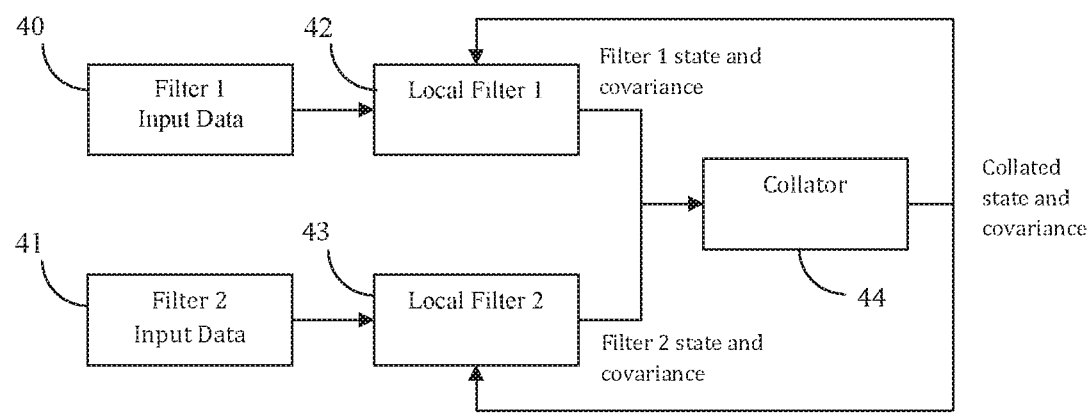
FIG. 9 schematically illustrates a federated filter architecture for illustrating the context in which some embodiments of the invention have been developed.

FIG. 9 shows the federated filter architecture with two local filters. Each local filter 42, 43 processes input data 40, 41 and thereby estimates a state vector that includes states common to all local filters, called the common states, and states that are unique to each local filter, called the unique states. Each local filter processes a unique set of Kalman filter measurements that is statistically independent of all other measurements, thereby rendering the estimated common states from the local filters statistically independent of each other.

The collator 44 implements a variance-weighted sum of the common states and their covariances from the local filters. The variance-weighted sum operation is called "collation". The common states and corresponding covariances in the local filters are then replaced by the collated common states and corresponding covariances. This is referred to as a local filter reset. It makes the common states in the local filters equally accurate as the collated common states.

J.2 Stochastic State and Observation Models

A federated filter with two local filters is designed to estimate the states of a multivariable stochastic model comprising two coupled stochastic models M1 and M2 described as follows.

$$\vec{x}(k+1) = A(k)\vec{x}(k) + \vec{\mu}(k) \quad (1)$$

where $$\vec{x} = \begin{bmatrix} \vec{x}_c \\ \vec{x}_1 \\ \vec{x}_2 \end{bmatrix} \quad (2)$$

is a vector of n states called the state vector, $$A = \begin{bmatrix} A_c & A_{c1} & A_{c2} \\ 0 & A_1 & 0 \\ 0 & 0 & A_2 \end{bmatrix} \quad (3)$$

is the n×n system dynamics matrix, and $$\vec{\mu} = \begin{bmatrix} \vec{\mu}_c \\ \vec{\mu}_1 \\ \vec{\mu}_2 \end{bmatrix} \quad (4)$$

is a vector of n temporally uncorrelated process noises called the process noise vector with covariance $$E[\vec{\mu}\vec{\mu}^T] = Q = \begin{bmatrix} Q_c & 0 & 0 \\ 0 & Q_1 & 0 \\ 0 & 0 & Q_2 \end{bmatrix} \quad (5)$$

The federated filter operates on observations modeled as follows:

$$z(k) = C(k)\vec{x}(k) + \vec{\eta}(k) \quad (6)$$

where $$\vec{z} = \begin{bmatrix} \vec{z}_1 \\ \vec{z}_2 \end{bmatrix} \quad (7)$$

is a vector of m observations called the observation vector, $$C = \begin{bmatrix} C_{c1} & C_1 & 0 \\ C_{c2} & 0 & C_2 \end{bmatrix} \quad (8)$$

is an m×n design matrix, and $$\vec{\eta} = \begin{bmatrix} \vec{\eta}_1 \\ \vec{\eta}_2 \end{bmatrix} \quad (9)$$

is a vector of m temporally uncorrelated observation noises called the observation noise matrix, with covariance $$E[\vec{\eta}\vec{\eta}^T] = R = \begin{bmatrix} R_1 & 0 \\ 0 & R_2 \end{bmatrix} \quad (10)$$

The stochastic model represented by equations (1) to (10) may be expressed as follows so as to show the model as comprising two coupled stochastic models M1 and M2:

$$\vec{x}_c(k+1) = A_c(k)\vec{x}_c(k) + \vec{\mu}_c(k) + A_{c1}(k)\vec{x}_1(k) + A_{c2}(k)\vec{x}_2(k)$$

$$\vec{x}_1(k+1) = A_1(k)\vec{x}_1(k) + \vec{\mu}_1(k)$$

$$\vec{x}_2(k+1) = A_2(k)\vec{x}_2(k) + \vec{\mu}_2(k) \quad (11)$$

The state vector shown by equation (2) contains a subvector $\vec{x}_c$ with length nc which is the common state vector because it is common to both coupled models M1 and M2. The state vector shown by equation (2) contains subvectors $\vec{x}_1$ and $\vec{x}_2$ with lengths n1 and n2 that are unique to coupled models M1 and M2 and hence are called unique state vectors.

J.3 Local Stochastic Models

The following local stochastic models indexed by i=1, 2 are assembled from the stochastic model represented by equations (1) to (10). Each local stochastic model state vector comprises the common state vector and one of the unique state vectors.

$$\vec{y}_i(k+1) = F_i(k)\vec{y}_i(k) + \vec{v}_i(k) \quad (12)$$
$$\vec{z}_i(k) = H_i(k)\vec{y}_i(k) + \vec{\eta}_i(k)$$

$$\vec{y}_i = \begin{bmatrix} \vec{x}_c \\ \vec{x}_i \end{bmatrix} \quad (13)$$

$$F_i = \begin{bmatrix} A_c & A_{ci} \\ 0 & A_i \end{bmatrix} \quad (14)$$

$$\vec{v}_i = \begin{bmatrix} \vec{\mu}_c \\ \vec{\mu}_i \end{bmatrix} \quad (15)$$

$$E[\vec{v}_i\vec{v}_i^T] = \begin{bmatrix} Q_c & 0 \\ 0 & Q_i \end{bmatrix} \quad (16)$$

$$H_i = [\, C_c \quad C_i \,] \quad (17)$$

$$E[\vec{\eta}_i\vec{\eta}_i^T] = R_i \quad (18)$$

The federated filter implements the following local Kalman filters for the local stochastic models.

$$\hat{\vec{y}}_i^-(k) = \{F_i\hat{\vec{y}}_i^+\}_{k-1}$$

$$\overline{P}_i^-(k) = \{F_i\overline{P}_i^+F_i^T + \overline{Q}_i\}_{k-1} \quad (19)$$

$$\hat{\vec{y}}_i^+(k) = \{\hat{\vec{y}}_i^- + K_i(\vec{z}_i - H_i\hat{\vec{y}}_i^-)\}_k$$

$$K_i(k) = \{\overline{P}_i^- H_i^T R_i^{-1}\}_k$$

$$\overline{P}_i^+(k) = \{(I - K_i H_i^T)\overline{P}_i^-\}_k \quad (20)$$

for i=1, 2 where $$\overline{P}_i(0) = \gamma_i \begin{bmatrix} P_c(0) & 0 \\ 0 & P_i(0) \end{bmatrix} \quad (21)$$

$$\overline{Q}_i(k) = \gamma_i \begin{bmatrix} Q_c(k) & 0 \\ 0 & Q_i(k) \end{bmatrix} \quad (22)$$

where $$1/\gamma_1 + 1/\gamma_2 = 1, \gamma_1 + \gamma_2 = 4 \text{ and } 0 \le 1/\gamma_i \le 1 \quad (23)$$

$P_c(0)$, $P_1(0)$ and $P_2(0)$ are the initial estimation error uncertainty covariances for the common and unique states in the coupled stochastic models M1 and M2. Typically but not necessarily these covariances are diagonal matrices of initial uncertainty variances.

The federated filter is necessarily sub-optimal with respect to a Kalman filter designed for the stochastic model represented by equations (1) to (10) because it ignores the cross-correlations that may exist between $x_1$ and $x_2$. The scalar weights $\gamma_1$ and $\gamma_2$ are used to ensure that the federated filter's estimation error covariance is not smaller than the estimation error covariance of a Kalman filter.

The respective estimated states and covariance matrices from the two local filters are the following. The superscript $\mp$ indicates the equation holds for both a priori (time updated) and a posteriori (observation updated) quantities.

$$\hat{\vec{y}}_i^\mp(k) = \begin{bmatrix} \hat{\vec{x}}_{ci}^\mp \\ \hat{\vec{x}}_i^\mp \end{bmatrix}_k \quad (24)$$

$$\overline{P}_i^\mp = \begin{bmatrix} W_{ci}^\mp & V_{ci}^\mp \\ V_{ci}^{\mp T} & W_i^\mp \end{bmatrix} \quad (25)$$

where $\hat{\vec{x}}_{ci}^\mp$ and $W_{ci}^\mp$ are respectively the estimated common state and corresponding estimation error covariance generated by local filter i=1 or 2.

J.4 Collation

The collated a priori and a posteriori common-state covariance is $$W_{cc}^\mp = ((W_{c1}^\mp)^{-1} + (W_{c2}^\mp)^{-1})^{-1} \quad (26)$$

The collated a priori and a posteriori common state vector is $$\hat{\vec{x}}_{cc}^\mp = W_{cc}^\mp((W_{c1}^\mp)^{-1}\hat{\vec{x}}_{c1}^\mp + (W_{c2}^\mp)^{-1}\hat{\vec{x}}_{c2}^\mp) \quad (27)$$

Equations (26) and (27) describe the variance-weighted sum of the common states from the two local filters. The statistical independence of the estimated common state from the local filters implies that the variance-weighted sum is the optimal estimate of the common state vector within the context of the federated filter.

J.5 Local Filter Reset

The local filter reset comprises the following operation that replaces each local filter's common state vector and corresponding covariance submatrix with the collated common state vector (equation (27)) and covariance matrix (equation (26)). The local filter reset occurs every filter epoch.

The local filter resets may be applied before a local filter time update, in which case the collated a posteriori collated common state vector and covariance are used as follows.

$$\begin{bmatrix} \vec{x}_{cc}^+ \\ \vec{x}_i^+ \end{bmatrix} \rightarrow \begin{bmatrix} \vec{x}_{ci}^+ \\ \vec{x}_i^+ \end{bmatrix} \begin{bmatrix} \gamma_i W_{cc}^+ & V_{ci}^+ \\ (V_{ci}^+)^T & W_i^+ \end{bmatrix} \rightarrow \begin{bmatrix} W_{ci}^+ & V_{ci}^+ \\ (V_{ci}^+)^T & W_i^+ \end{bmatrix} \quad (28)$$

Or they can be applied before a local filter observation update, in which case the collated a priori collated common state vector and covariance are used as follows.

$$\begin{bmatrix} \vec{x}_{cc}^- \\ \vec{x}_i^- \end{bmatrix} \rightarrow \begin{bmatrix} \vec{x}_{ci}^- \\ \vec{x}_i^- \end{bmatrix} \begin{bmatrix} \gamma_i W_{cc}^- & V_{ci}^- \\ (V_{ci}^-)^T & W_i^- \end{bmatrix} \rightarrow \begin{bmatrix} W_{ci}^- & V_{ci}^- \\ (V_{ci}^-)^T & W_i^- \end{bmatrix} \quad (29)$$

Or they can be applied both before and after a local filter time update. This may be a redundant operation dependent on the system dynamics models and observation design matrices for the two local stochastic models.

Let us now describe further embodiments of the invention.

As discussed above in section J, in a conventional federated filter, a variance-weighted sum of the common states from the local filters is computed to form the optimal estimate of the common states within the context and limitations of the federated filter. This operation is called collation. The collated common states and corresponding covariances then replace the estimated common states and covariances in the local filters, thereby transferring the estimation accuracy of the collated states to the local filters. This is called a local filter reset. It requires the common states and covariances from the timely and precise estimators and the collator to have the same times of validity.

If the navigator error states and covariance from timely estimator 55 and collator have the same time of validity, then the navigator error states can be designated as the common states that are collated. A local filter reset of the navigator error states of timely estimator 55 can subsequently be performed. The estimated navigator error states from timely estimator 55 may then be used to correct the navigator as part of a closed error regulation control loop that regulates the navigator errors to the precision achieved by the collated navigator error states. The reference GNSS measurements are however generally delayed for a number of reasons that are typical in RTK and PPP-like positioning. This delays precise estimator 57 by up to 30 seconds, with examples of delay components listed earlier, which might destabilize the navigator error regulation loop if the delay was not handled. Propagation of the estimated navigator error states from precise estimator 57 generally results in significant erosion of the precision of the estimates. In that context, estimated quantities that can be safely extrapolated by up to 30 seconds with little or no information loss are the quantities having constant or nearly constant stochastic models.

Both timely estimator 55 and precise estimator 57 may process undifferenced rover carrier phase measurements, so that both estimators may include and explicitly maintain common states comprising the biases in the undifferenced carrier phases. These states are called the carrier phase lumped bias states because they contain all of the biases intrinsic to undifferenced carrier phases, namely constant integer ambiguities and slowly changing ionosphere and troposphere delays and satellite orbit and clock errors. The biases are lumped together into single states per satellite to achieve computational efficiency. Thus, in one embodiment, undifferenced carrier phase lumped biases are explicitly estimated by both estimators. In other words, the reset-designated states are explicitly maintained in both local filters (precise and timely estimators) of a federated filter, and hence the federated filter equations can be applied directly. Both estimators implement undifferenced carrier phase lumped bias states and process undifferenced carrier phase measurements to estimate these states directly to the precision of each estimator. Those are the explicitly-maintained common states for collation and reset in a federated filter.

In another embodiment, precise estimator 57 does not explicitly maintain the carrier phase lumped bias states but rather implicitly maintains them (as defined above), i.e. it assembles those as a merger of the components of the carrier phase lumped biases that precise estimator 57 estimates explicitly. Only timely estimator 55 implements the undifferenced carrier phase lumped bias states explicitly. Precise estimator 57 assembles the precisely estimated lumped bias states from carrier phase error components that it estimates explicitly (such as for example ambiguities, ionosphere delay, etc.). These are then collated and used to reset timely estimator 55.

In yet another embodiment, the biases may also be transferred as separate states. Both estimators implement the separate undifferenced carrier phase error component states, and timely estimator 55 processes undifferenced carrier phase measurements. These component states are the explicitly-maintained common states for collation and reset in a federated filter.

The precise estimator 57 plus ambiguity search and validation process may estimate these states with centimeter precision. These precisely estimated lumped biases have a nearly constant stochastic model over a 30-second delay and so can be extrapolated to the current time with little information loss.

In another embodiment, the collation of the lumped biases from precise estimator 57 and timely estimator 55 is approximated by the adoption of the lumped biases from precise estimator 57 as the collated ones. This approximation is reasonable because the lumped biases from precise estimator 57 are expected to be significantly more precise than those from timely estimator 55. The precision transfer to timely estimator 55 is then achieved by performing a local filter reset using the collated lumped biases (as illustrated for example by FIG. 11). Because the collated lumped biases are approximated by the lumped biases from precise estimator 57, only timely estimator 55 needs to be reset. This comprises the replacement s140 of the timely estimator's 55 lumped bias states and covariance sub-matrix with those from precise estimator 57. Following this reset, the undifferenced carrier phase measurements in timely estimator 55 become precise range measurements because the collated lumped biases account for almost all the error in the undifferenced carrier phase measurements. These now precise range measurements then allow timely estimator 55 to estimate the navigator errors with precision approximately equal to the precision of the navigator errors estimated by precise estimator 57.

The actual implementation does not require the precise estimator 57 to process undifferenced carrier phase measurements or implement explicit lumped bias states because precise estimator 57 already estimates the significant components of the carrier phase lumped biases. Consequently, the lumped biases generated by precise estimator 57 may be computed as the merger of these estimated components.

Thus, in some embodiments, the use of, for example, carrier phase lumped biases as common states in a federated filter architecture containing timely estimator 55 and precise estimator 57 as local filters may achieve a precision transfer from precise estimator 57 to timely estimator 55 with negligible or minor precision erosion over precise estimator delays lasting up to 30 seconds.

FIG. 10 schematically illustrates the architecture of an aided navigator with delayed estimation, in one embodiment of the invention. The embodiment illustrated in FIG. 10 may be regarded a specific form of the embodiment illustrated in FIG. 3d.

Navigator 53 receives data from navigator sensor(s) 50 and from these it computes a navigation solution (whose content depends on the particular implementation). The navigation solution is referred to as "blended navigation solution" in FIG. 10, wherein "(sensor) blending" in this context is the same as "sensor fusion" that describes the estimation of a desired scalar or multi-variable quantity from the data generated by multiple sensors. The navigation solution is a blended navigation solution that results from the optimal fusion of navigation sensor data and GNSS data.

In an aided INS embodiment, navigator 53 is an inertial navigator and navigation sensor(s) 50 is an inertial measurement unit (IMU).

Figure 8:
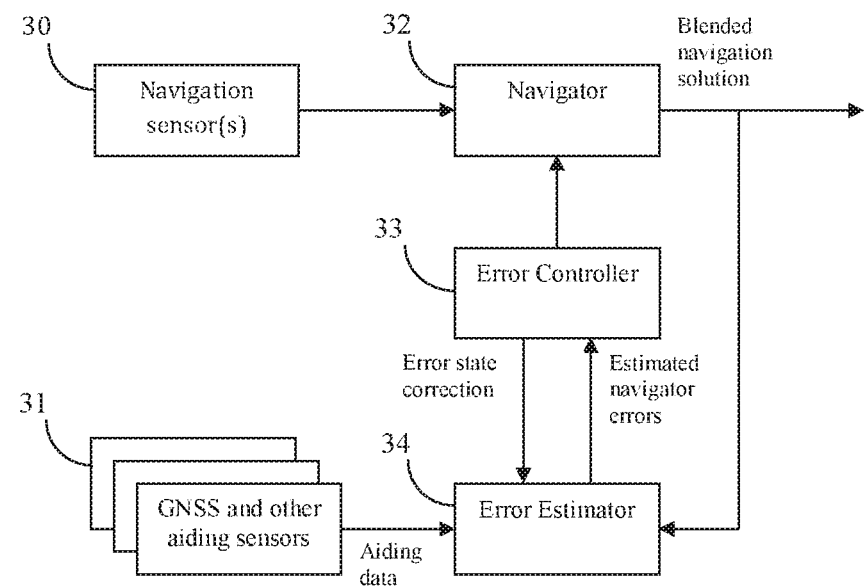
FIG. 8 schematically illustrates a close-loop aided navigator architecture for illustrating the context in which some embodiments of the invention have been developed.

The error estimator shown in FIG. 8 has been partitioned into a federated filter shown in FIG. 9 that contains two local filters, i.e. timely estimator 55 and precise estimator 57. The two estimators may use the following states for common state vector collation, i.e. may use the following reset-designated state variables:

Navigator error states
Autonomous carrier phase bias states

It is sufficient to implement autonomous carrier phase bias states for single frequency carrier phases per GNSS. Usually the carrier phases with the following attributes are selected for lumped phase bias modelling:

lowest tracking noise
most reliable tracking
greatest availability

Timely estimator 55 receives the navigation solution from navigator 53 and timely autonomous GNSS measurements 51 that includes autonomous carrier phases. It may also receive timely non-GNSS aiding sensor data. Aiding sensor data are regarded as timely if they arrive at timely estimator 55 within one estimator epoch (i.e., within one receiver epoch), which is typically one second.

Timely estimator 55 constructs observations from the navigation solution and the autonomous GNSS and non-GNSS aiding sensor data that it receives for the purpose of estimating the navigator error states in a timely fashion. This process is commonly known as the estimator's observation update.

Error controller 54 converts the estimated navigator error states to navigator corrections and sends these to navigator 53. It also assembles corrections to the estimated navigator error states maintained by the timely and precise estimators to account for the corrections to navigator 53. Navigator 53 receives the corrections from error controller 54 and applies the corrections.

Precise estimator 57 receives differenced GNSS measurements 52 that a data preparation process has computed from GNSS measurements from the rover receiver and one or more reference receivers. A single differenced measurement comprises the difference between each rover measurement and the corresponding measurement from a reference receiver, a network of reference receivers or a GNSS correction stream. Common mode errors between the rover and reference receivers cancel or are significantly attenuated in the single differenced measurements. A double-differenced measurement comprises the between-satellite differences between single differenced measurements. Common mode errors between receiver channels such as receiver clock offset cancel in the double-differenced measurements.

Precise estimator 57 is typically able to estimate the navigator error states with greater accuracy than timely estimator 55 is able to, because of the increased accuracies of the differenced measurements and on the estimator's ability to separately estimate the error components in the carrier phase measurements, in particular the integer ambiguities. Precise estimator 57 may include an ambiguity estimator that exploits the integer attribute of the ambiguities to obtain very precise estimates of the ambiguities and by extension precise estimates of the different GNSS measurement errors. This process has the names "ambiguity resolution" and "integer constrained estimation" among others. With such estimation of the carrier phase error terms with greater accuracy than obtainable by timely estimator 55, precise estimator 57 is able to estimate the navigator error states with corresponding greater accuracy.

If the estimated error states from both estimators were timely, then a federated filter collation (see equations (26), (27)) of the navigator error states and corresponding covariances could be computed to obtain the federated filter estimate and corresponding covariance of the navigator errors at each estimator epoch. A local filter reset of both estimators (see equations (28) or (29)) using the collated navigator error state vector and covariance comprises an accuracy transfer from the more accurate precise estimator 57 to the less accurate timely estimator 55. The resulting navigator error correction via error controller 54 would result in a corrected navigator that computed a navigation solution with the accuracy of the federated filter estimate of navigation errors.

However the reference GNSS measurements are expected to be delayed because of reasons that are typical in real-time differential GNSS positioning and navigation. These include limited reference-rover data channel capacity, frequent interruptions of data transmissions and server processing delays. Typical delays in reference measurement data may be as large as 30 seconds. Precise estimator 57 is therefore required to operate on delayed input data. To accommodate this requirement, a delay buffer 58 provides a means for delaying the timely navigator solution and estimator corrections that precise estimator 57 is required to process.

A delayed federated filter collation of the navigator error states from the timely and precise estimators would become unusable for navigator error control because the error regulation closed loop would become unstable. A typical aided INS error regulation loop becomes unstable with less than 2 seconds of delay unless some form of loop stabilization such as reduced loop gain is implemented. This too has its limit at around 5 seconds of delay. This implies that the delayed collated navigator error states would not be usable for precision transfer from precise estimator 57 to timely estimator 55.

A method of implementing precision transfer from the delayed precise estimator 57 to timely estimator 55, in one embodiment of the invention, is via carrier phase lumped biases. As part of the respective observation update, timely estimator 55 and precise estimator 57 both construct the following observations from the navigator position solution and the autonomous carrier phases for each carrier phase measurements they receive:

$$z_i = |\hat{\vec{r}}_i^n - \hat{\vec{r}}_{ant}^n| + \lambda \phi_i, i=1,\ldots,n_{meas} \quad (30)$$

where $\hat{\vec{r}}_{ant}^n$ is the rover antenna position vector in a navigation frame n computed from the navigator's navigation solution, $\hat{\vec{r}}_i^n$ is position of the satellite corresponding to the $i^{th}$ carrier phase measurement, $\phi_i$ is the $i^{th}$ carrier phase measurement, $\lambda$ is the carrier phase measurement wavelength, $n_{meas}$ is the number of carrier phase measurements involved in the lumped bias method.

The observation model is given as follows for $i=1,\ldots,n_{meas}$:

$$z_i = -(\vec{u}_i^n)^T (\delta \vec{r}_i^n - \delta \vec{r}_{ant}^n) + \lambda \delta \phi_i \quad (31)$$
$$= (\vec{u}_i^n)^T \delta \vec{r}_{ant}^n - (\vec{u}_i^n)^T \delta \vec{r}_i^n + \lambda \delta \phi_i$$

where $\delta \vec{r}_{ant}^n$ is the antenna position error, $\delta \vec{r}_i^n$ is position error of the satellite corresponding to the $i^{th}$ carrier phase measurement, $\vec{\mu}_i^n$ is the unit line of sight vector from the rover antenna to the satellite corresponding to the $i^{th}$ carrier phase measurement, $\delta \phi_i$ is the $i^{th}$ carrier phase measurement error.

The carrier phase error has the following known characteristics:

$$\delta \phi_i = -\frac{1}{\lambda}\left(c(dT - dt_i) + \delta r_i^{tropo} - \delta r_i^{iono} + \delta r_i^{mpath}\right) + N_i + \eta_i \quad (32)$$

where dT is the receiver clock offset, $dt_i$ is the clock error of the satellite corresponding to the $i^{th}$ carrier phase, $\delta r_i^{tropo}$ is the troposphere delay in the $i^{th}$ carrier phase, $\delta r_i^{iono}$ is the ionosphere advance in the $i^{th}$ carrier phase, $\delta r_i^{mpath}$ is the multipath error in the $i^{th}$ carrier phase, $N_i$ is the integer ambiguity in the $i^{th}$ carrier phase, $\eta_i$ is the $i^{th}$ carrier phase broadband noise.

Both estimators use the following simple observation model for the observations (31) for $i=1,\ldots,n_{meas}$ $$z_i = (\vec{u}_i^n)^T \delta \vec{r}_{ant}^n - cdT - \delta r_i^{mpath} + \lambda \eta_i - b_i \quad (33)$$

where $b_i$ is a lumped bias in the $i^{th}$ carrier phase that combines the following known carrier phase errors:

$$b_i = -(\vec{u}_i^n)^T \delta \vec{r}_i^n + cdt_i - \delta r_i^{tropo} + \delta r_i^{iono} + \lambda N_i \quad (34)$$

A significant attribute of the carrier phase errors that make up the lumped carrier phase bias represented by equation (34) is that they change slowly with time and hence are expected to remain approximately constant over the delays of interest, i.e. 30 seconds or less.

Precise estimator 57 is able to estimate the lumped carrier phase biases $b_i$ where $i=1,\ldots,n_{meas}$ with accuracies commensurate with its achievable precision. For example, if precise estimator 57 included a carrier phase integer ambiguity resolution or integer constraint mechanism, then it is able to estimate the lumped carrier phase biases $b_i$ with as little as a few centimeters accuracy. Because the lumped carrier phase biases $b_i$ change slowly with time, the loss in accuracy over a delay on the order 30 seconds or less is small.

In another embodiment, code phase lumped biases are used instead of the above-described carrier phase lumped biases. Code phase measurements (also called pseudoranges) are noisier and more prone to multipath errors than carrier phase measurements, so that code phase lumped biases are generally expected to be less precise than carrier phase lumped biases. Those may however be advantageous for example if the rover receiver does not provide carrier phase measurements. Without carrier phase measurements, precise estimator 57 can achieve at best a level of precision in its estimates commensurate with code phase differential GNSS on the order of 0.5 meters.

In this case, timely estimator 55 and precise estimator 57 both construct the following observations from the navigator position solution and the autonomous code phases for each code phase measurements they receive:

$$z_i = |\hat{\vec{r}}_i^n - \hat{\vec{r}}_{ant}^n| - \rho_i, i=1,\ldots n_{meas} \quad (35)$$

where $\hat{\vec{r}}_{ant}^n$ is the rover antenna position vector in a navigation frame n computed from the navigator's navigation solution, $\hat{\vec{r}}_i^n$ is position of the satellite corresponding to the $i^{th}$ code phase measurement, $\rho_i$ is the $i^{th}$ code phase measurement, $n_{meas}$ is the number of code phase measurements involved in the lumped bias method.

The observation model is given as follows for i=1, . . . , $n_{meas}$:

$$z_i = -(\vec{u}_i^n)^T (\delta\vec{r}_i^n - \delta\vec{r}_{ant}^n) - \delta\rho_i \quad (36)$$
$$= (\vec{u}_i^n)^T \delta\vec{r}_{ant}^n - (\vec{u}_i^n)^T \delta\vec{r}_i^n - \delta\rho_i$$

where $\delta\vec{r}_{ant}^n$ is the antenna position error, $\delta\vec{r}_i^n$ is position error of the satellite corresponding to the $i^{th}$ code phase measurement, $\vec{u}_i^n$ is the unit line of sight vector from the rover antenna to the satellite corresponding to the $i^{th}$ code phase measurement, $\delta\rho_i$ is the $i^{th}$ code phase measurement error.

The code phase error has the following known characteristics:

$$\delta\rho_i = c(dT - dt_i) + dr_i^{tropo} + dr_i^{iono} + dr_i^{mpath} + v_i \quad (37)$$

where dT is the receiver clock offset, $dt_i$ is the clock error of the satellite corresponding to the $i^{th}$ code phase, $dr_i^{tropo}$ is the troposphere delay in the $i^{th}$ code phase, $dr_i^{iono}$ is the ionosphere advance in the $i^{th}$ code phase, $dr_i^{mpath}$ is the multipath error in the $i^{th}$ code phase, $v_i$ is the $i^{th}$ code phase broadband noise.

Both estimators use the following simple observation model for the observations (31) for i=1, . . . , $n_{meas}$ $$z_i = (\vec{u}_i^n)^T \delta\vec{r}_{ant}^n - cdT - \delta r_i^{mpath} - v_i - b_i \quad (38)$$

where $b_i$ is a lumped bias in the $i^{th}$ code phase that combines the following known code phase errors:

$$b_i = -(\vec{u}_i^n)^T \delta\vec{r}_i^n + cdt_i + \delta r_i^{tropo} + \delta r_i^{iono} \quad (39)$$

The code phase errors that make up the lumped carrier phase bias (see equation (34)) change slowly with time and hence are expected to remain approximately constant over the delays of interest that are 30 seconds or less.

The precise estimator 57 is able to estimate the lumped code phase biases $b_i$ where i=1, . . . , $n_{meas}$ with accuracies commensurate with its achievable precision that may range from 0.5 meters for code phase differential GNSS to around 0.05 meters with RTK methods. Carrier smoothing of code phase measurements described in reference [7] is another method of code phase noise suppression that allows for improved code phase lumped bias determination. Because the lumped code phase biases $b_i$ change slowly with time, the loss in accuracy over a delay on the order 30 seconds or less is small.

The lumped carrier phase biases (see equation (34)) or code phase biases (see equation (39)) may be implemented in timely estimator 55 and delayed precise estimator 57 and may be designated as the common states in the federated filter described in above section J. This implies $$\vec{x}_{cT}(k) = \vec{b}_T(k)$$

$$\vec{x}_{cP}(k) = \vec{b}_P(k) \quad (40)$$

where $\vec{b}_T(k)$ is the vector of the lumped bias states implemented in timely estimator 55 and $\vec{b}_P(k)$ is the vector of the lumped bias states implemented in precise estimator 57.

Precise estimator 57 is delayed by d estimator epochs (i.e., receiver epochs) with respect to timely estimator 55. Because the estimated lumped bias state vector remains essentially constant over the precise estimator delay, the estimated lumped bias state vector and estimation error covariance from precise estimator 57 have the following behavior at the $k^{th}$ timely estimator epoch:

$$\hat{\vec{b}}_P^-(k) \approx \hat{\vec{b}}_P^+(k-d)$$

$$W_{bP}^-(k) \approx W_{bP}^+(k-d) \quad (41)$$

The collated code or carrier phase lumped bias states are obtained from equations (26) and (27) as follows:

$$W_{col}^+(k) = ((W_{bT}^+(k))^{-1} + (W_{bP}^+(k-d))^{-1})^{-1} \quad (42)$$

$$\hat{\vec{b}}_{col}^+(k) = W_{col}^+(k)((W_{bT}^+(k))^{-1} \hat{\vec{b}}_T^+(k) + (W_{bP}^+(k-d))^{-1} \hat{\vec{b}}_P^+(k-d)) \quad (43)$$

where $\hat{\vec{b}}_T^{\pm}(k)$ are the a priori and a posteriori estimated lumped bias state vectors from timely estimator 55, and $W_{bT}^{\pm}(k)$ are the corresponding estimation error covariances.

The local filter resets are then given by equations (28) or (29) as applied to the lumped biases as common states. This implements a transfer of precision from the more accurate precise estimator 57 to the less accurate timely estimator 55 in spite of the delay in the precise estimator data.

In another embodiment, as illustrated by FIG. 11, the architecture differs from the architecture described with reference to FIG. 10 in that no collator is used. The embodiment illustrated in FIG. 10 may be regarded a specific form of the embodiment illustrated in FIG. 3b. Furthermore, the carrier phase lumped bias data from precise estimator 57 is used directly to reset timely estimator 55, and precise estimator 57 is not reset.

Precise estimator 57 processes rover and delayed reference GNSS measurements and from these computes estimates of its common and unique states whose accuracies are consistent with centimeter-level position accuracy. This implies that precise estimator 57 includes some means of constraining the estimated carrier phase ambiguities to their correct integer values, a process commonly called RTK positioning.

Precise estimator 57 produces a vector of autonomous L1 carrier phase lumped bias estimates and a corresponding covariance matrix whose estimation accuracy is consistent with RTK positioning accuracy. It can do so either by including the lumped biases as states in its state vector or by constructing the lumped biases as a merger of the estimated constituent components shown in equation (34) that make up the lumped biases. In either case the estimated lumped biases may be considered estimates of common states.

The lumped biases from precise estimator 57 are assumed to be significantly more accurate than those from timely estimator 55. This implies that the collation equations (26) and (27) may be approximated as follows:

$$P_{col} = (P_{TEE}^{-1} + P_{PEE}^{-1})^{-1} \approx P_{PEE} \quad (44)$$

$$\hat{\vec{x}}_{col} = P_{col}(P_{PEE}^{-1} \hat{\vec{x}}_{PEE} + P_{TEE}^{-1} \hat{\vec{x}}_{TEE}) \approx \hat{\vec{x}}_{PEE} \quad (45)$$

where $P_{PEE}$ and $P_{TEE}$ are respectively the common state vector covariances from precise estimator 57 and timely estimator 55, and $P_{PEE}$ is assumed to be significantly smaller than $P_{TEE}$.

With the approximations of equations (44) and (45) to collation, the precise estimator reset is not required. Consequently, only the timely estimator 55 is reset.

In any embodiment, such as in the embodiments illustrated by FIGS. 10 and 11, code phase lumped biases, as described above, may be used instead of carrier phase lumped biases. This embodiment might not achieve the position accuracy of the embodiment using carrier phase lumped biases because the code phase noises and multipath errors are larger. This embodiment is, however, advantageous if the rover or reference receiver does not generate carrier phase measurements. GNSS receivers may not produce carrier phase measurements under low carrier-to-noise conditions when only non-coherent signal tracking is possible.

Furthermore, in any embodiment, such as in the embodiments illustrated by FIGS. 10 and 11, carrier smoothed code phase lumped biases may be used. Carrier smoothing (see reference [7]) is a method of combining code and carrier phases so as to suppress the code phase broadband noise and multipath error without introducing a carrier cycle phase ambiguity. Carrier smoothed code phase lumped biases thus is typically more precise than code phase lumped biases.

Yet furthermore, in any embodiment, such as in the embodiments illustrated by FIGS. 10 and 11, some or all of the individual states for each of the carrier phase errors described in equation (34) are designated as common states in the precise and timely estimators rather than their sum that forms the lumped bias. This generally increases the number of common states used to implement the precision transfer and hence this may significantly increase the number of floating point operations.

In embodiments such as for example those illustrated by FIGS. 10 and 11 in which a tightly-coupled integration embeds the navigator (e.g. INS) error states in timely estimator 55 (which also processes GNSS observations), timely estimator 55 estimates the navigator errors using the GNSS observations as well as the typical GNSS range errors such as receiver clock error, ionosphere delay and floated carrier phase ambiguities. Such a tightly-coupled integration architecture is advantageous in that it is capable of handling any number of visible satellites (from one satellite to any number of them). In contrast, the delta-phase methods referred to in the "Background" section cannot be implemented in a tightly-coupled aided INS configuration. A delta-phase filter typically would need to be part of a GNSS processing engine in a loosely-coupled integration.

The capability of handling any number of visible satellites may be further explained as follows. An exemplary scenario is the loss of all but three satellites before or during the delay period for receiving correction information from a network of reference stations. The delta-phase filter is now under-determined (less than four satellites) and would stop working so that the GNSS processing engine would be unable to provide any aiding information to the loosely-coupled aided INS estimator. In contrast, the tightly-coupled aided INS configuration (such as for example those illustrated by FIGS. 10 and 11) would continue to use the carrier phase data from the three remaining satellites. Timely estimator 55 would construct undifferenced carrier phase observations for the three remaining satellites that would be rendered precise by the reset-designated state variable values (e.g., the precise lumped biases for the three remaining satellites) received from precise estimator 57. The range observations would provide a three-dimensional constraint in a four-dimensional position-time space in which the INS position error and receiver clock error are contained.

System (or Apparatus)

Figure 12:
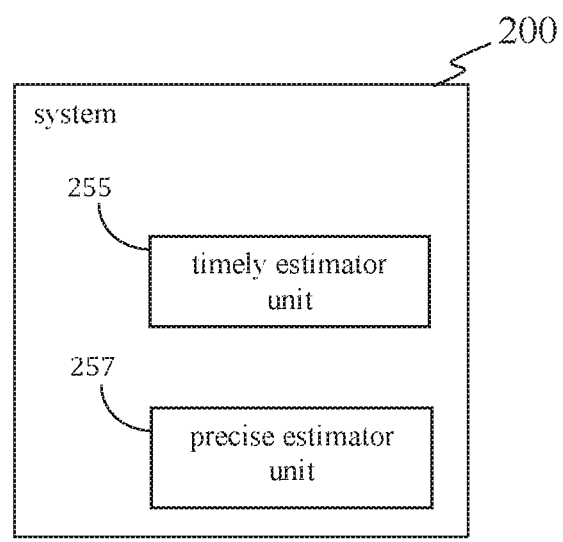
FIG. 12 schematically illustrates a system in one embodiment of the invention.

In one embodiment, schematically illustrated by FIG. 12, a system 200 comprises a NSS receiver and/or a processing entity capable of receiving data from the NSS receiver. In one embodiment, system 200 is a NSS receiver. In another embodiment, system 200 is a processing entity capable of receiving data from a NSS receiver.

System 200 aims at estimating parameters useful to determine a position. The NSS receiver observes a NSS signal from each of a plurality of NSS satellites over multiple receiver epochs.

System 200 comprises a first unit 255, herein referred to as "timely estimator unit" 255, configured to implement a first filter 55 ("timely estimator"), and a second unit 257, herein referred to as "precise estimator unit" 257, configured to implement a second filter 57 ("precise estimator"), wherein:

a) each of timely estimator 55 and precise estimator 57 is configured to use state variables, which may either be common to timely estimator 55 and precise estimator 57, said state variables being referred to as "common state variables", or unique to each of timely estimator 55 and precise estimator 57, said state variables being referred to as "unique state variables";

b) each of timely estimator 55 and precise estimator 57 is configured to compute values of their state variables based on NSS signals observed by the NSS receiver, and/or information derived from said NSS signals;

c) precise estimator 57 is configured to compute the values of the state variables that it uses further based on: observations that are not derived from NSS signals observed by the NSS receiver, and/or information derived from said observations; and d) precise estimator 57 is configured to be delayed by at least one receiver epoch with respect to timely estimator 55.

Furthermore, system 200 is configured for recurrently replacing, in timely estimator 55 of timely estimator unit 255, the values of each of some of the state variables computed by timely estimator 55 with: (i) the respective value of the corresponding state variable computed by precise estimator 57 of precise estimator unit 257, (ii) a respective value computed based on the values of some of the state variables computed by precise estimator 57, or (iii) a respective value computed based on: the values of some of the state variables computed by timely estimator 55 and the values of some of the state variables computed by precise estimator 57.

Additional Remarks

Any of the above-described methods and their embodiments may be implemented, at least partially, by means of a computer program. The computer program may be loaded on an apparatus, such as for example a NSS receiver (running on a rover station or a reference station) or a server (which may comprise one or a plurality of computers). Therefore, the invention also relates to a computer program, which, when carried out on an apparatus as described above, such as for example a NSS receiver (running on a rover station or a reference station) or a server, carries out any one of the above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods, systems and apparatuses.

NSS receivers may include an antenna, or may include multiple antennas to support attitude determination which may also benefit from the present invention, where said antennas are configured to receive the signals at the frequencies broadcasted by the satellites, processor units, one or more accurate clocks (such as crystal oscillators or atomic disciplined crystal oscillators), one or more central processing units (CPU), one or more memory units (RAM, ROM, flash memory, or the like), and a display for displaying position information to a user.

Where the terms "timely estimator unit", "precise estimator unit", and the like are used herein as units (or sub-units) of an apparatus (such as a NSS receiver), no restriction is made regarding how distributed the constituent parts of a unit (or sub-unit) may be. That is, the constituent parts of a unit (or sub-unit) may be distributed in different software or hardware components or devices for bringing about the intended function. Furthermore, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

The invention also relates to the following embodiments numbered (i) to (xii):

Embodiment (i): System (200) of claim 14, wherein the timely estimator (55) comprises at least one of a Kalman filter, a least squares estimator, and a robust estimator.

Embodiment (ii): System (200) of claim 14 or embodiment (i), wherein the precise estimator (57) comprises at least one of a Kalman filter, a least squares estimator, and a robust estimator.

Embodiment (iii): System (200) according to any one of claim 14 and embodiments (i) and (ii), wherein the state variables whose values in the timely estimator (55) are configured to be recurrently replaced as defined in claim 14 have predictable behaviour over the time interval by which the precise estimator (57) is delayed with respect to the timely estimator (55).

Embodiment (iv): System (200) according to any one of claim 14 and embodiments (i) to (iii), wherein the state variables whose values in the timely estimator (55) are recurrently replaced as defined in claim 14 are expected to have constant or near constant stochastic models over the time interval by which the precise estimator (57) is delayed with respect to the timely estimator (55).

Embodiment (v): System (200) according to any one of claim 14 and embodiments (i) to (iv), wherein the state variables whose values in the timely estimator (55) are configured to be recurrently replaced as defined in claim 14 comprise at least one of: ionospheric biases, tropospheric biases, satellite orbital biases, satellite clock errors, carrier phase ambiguities, carrier phase multipath errors, and code phase multipath errors.

Embodiment (vi): System (200) according to any one of claim 14 and embodiments (i) to (v), wherein the state variables whose values in the timely estimator (55) are configured to be recurrently replaced as defined in claim 14 comprise at least one of: carrier phase biases; code phase biases; and carrier-phase-smoothed code phase biases.

Embodiment (vii): System (200) according to any one of claim 14 and embodiments (i) to (vi), wherein each of the timely estimator (55) and precise estimator (57) are configured to compute the values of their state variables based on carrier phase measurements generated based on the NSS signals observed by the NSS receiver.

Embodiment (viii): System (200) according to any one of claim 14 and embodiments (i) to (vii), wherein the timely estimator (55) is configured to compute the values of its state variables further based on a navigation solution computed based on data from at least one of: an inertial navigation system of, or connected to, the NSS receiver; and a distance measurement instrument navigation system of, or connected to, the NSS receiver.

Embodiment (ix): System (200) according to any one of claim 14 and embodiments (i) to (viii), wherein the observations that are not derived from NSS signals observed by the NSS receiver comprise: NSS observations from at least one reference receiver.

Embodiment (x): System (200) of embodiment (ix), wherein the precise estimator (57) is configured to compute the values of its state variables based on differences between NSS observations made based on the NSS signals observed by the NSS receiver, and the NSS observations from at least one reference receiver.

Embodiment (xi): System (200) according to any one of claim 14 and embodiments (i) to (x), wherein recurrently replacing (s140) comprises: recurrently replacing, in the timely estimator (55), the value of each of some of the state variables and associated covariances computed by the timely estimator (55) with:
- the respective value of the corresponding state variable and associated covariance computed by the precise estimator (57),
- respective values computed based on the values of some of the state variables and associated covariances computed by the precise estimator (57), or
- respective values computed based on: the values of some of the state variables and associated covariances computed by the timely estimator (55) and the values of some of the state variables and associated covariances computed by the precise estimator (57).

Embodiment (xii): System (200) according to any one of claim 14 and embodiments (i) to (xi), wherein recurrently replacing (s140) comprises: recurrently replacing (s140), in the timely estimator (55), the value of each of some of the state variables computed by the timely estimator (55) with a respective value computed, by a collator (56) of a federated filter, based on: the values of some of the state variables computed by the timely estimator (55) and the values of some of the state variables computed by the precise estimator (57).

Although the present invention has been described on the basis of detailed examples, the detailed examples only serve to provide the skilled person with a better understanding, and are not intended to limit the scope of the invention. The scope of the invention is much rather defined by the appended claims.

Abbreviations

ADNS aided DMI navigation system
AHRS attitude and heading reference system

AINS aided inertial navigation system
ANS aided navigation system
DMI distance measurement instrument or indicator
DNS DMI navigation system
ECEF earth centered earth fixed (coordinate frame)
GNSS global navigation satellite system
GPS global positioning system
IMU inertial measurement unit
INS inertial navigation system
KF Kalman filter
NSS navigation satellite system
PDOP position dilution of precision
PPP precise point positioning
RAM random-access memory
ROM read-only memory
RTK real-time kinematic

REFERENCES

[A] Hofmann-Wellenhof B., et al., *GNSS, Global Navigation Satellite Systems, GPS, GLONASS, Galileo, & more*, Springer-Verlag Wien, 2008.
[B] Vollath U. et al, international (PCT) application WO 2012/151006 A1 (application number: PCT/US2012/029694), *GNSS Signal Processing With Delta Phase*, published on 8 Nov. 2012
[1] George Siouris, *Aerospace Avionics Systems, A Modern Synthesis*, Academic Press 1993.
[2] A. Lawrence, *Modern Inertial Technology, Navigation Guidance and Control, Second Edition*, Springer 1998.
[3] R. G. Brown and P. Y. C. Hwang, *Introduction to Random Signals and Applied Kalman Filtering*, $3^{rd}$ Edition, John Wiley & Sons 1997.
[4] R. M. Rogers, *Applied Mathematics in Integrated Navigation Systems*, AIAA Education Series 2000.
[5] P. G. Savage, *Strapdown Analytics, Parts 1 and 2*, Strapdown Associates, 2000.
[6] J. Spilker & B. Parkinson, *Global Positioning System, Theory and Practice Volume I*, AIAA Press.
[7] B. Hofmann-Wellenhof, H. Lichtenegger and J. Collins, *GPS Theory and Practise*, $5^{th}$ Edition, Springer 2001.
[8] Elliot D. Kaplan (editor), *Understanding GPS Principles and Applications*, Artech House Publishers (1996)
[9] Paul de Jonge and Christian Tiberius, *The LAMBDA method for integer ambiguity estimation: implementation aspects*, Publications of the Delft Geodetic Computing Centre, No. 12, August 1996.
[10] Neal A. Carlson, *Federated Square Root Filter for Decentralized Parallel Processing*, IEEE Transactions on Aerospace and Electronic Systems, Vol. 26, No. 3, May 1990.
[11] Neal A. Carlson, *Federated Filter for Distributed Navigation and Tracking Applications*, Proceedings of the 58th Annual Meeting of The Institute of Navigation and CIGTF 21st Guidance Test Symposium, Jun. 24-26, 2002.
[12] S. J. Julier and J. K. Uhlmann, *A New Extension of the Kalman Filter to Nonlinear Systems*. Proceedings of AeroSense: The 11th Int. Symp. on Aerospace/Defence Sensing, Simulation and Controls, 1997.
[13] Wan, E. A.; Van Der Merwe, R., *The unscented Kalman filter for nonlinear estimation*, Proceedings of the IEEE 2000 Adaptive Systems for Signal Processing, Communications, and Control Symposium.
[14] Arulampalam, M. S., Maskell, S., Gordon, N. & Clapp, T. (2002), *A tutorial on particle filters for online nonlinear/non-gaussian Bayesian tracking*. IEEE Transactions on Signal Processing. 50(2):174-188.
[15] Huber, Peter J. (2009). *Robust Statistics* (2nd ed.). Hoboken, N. J.: John Wiley & Sons Inc.
[16] Wang, J. J., Wang, J., Sinclair, D. and Watts, L., 2006b. *A Neural Network and Kalman Filter Hybrid Approach for GPS/INS Integration*. In: G. T. Council (Editor), IAIN/GNSS 2006. Korean Institute of Navigation and Port Research, Jeju, Korea, pp. 277-282.
[17] Mark Euston, Paul Coote, Robert Mahony, Jonghyuk Kim and Tarek Hamel, *A Complementary Filter for Attitude Estimation of a Fixed-Wing UAV*, 2008 IEEE/RSJ International Conference on Intelligent Robots and Systems.
[18] *Dynamical Systems and Control*, edited by Firdaus E. Udwadia, H. I. Weber, George Leitmann, Syability and Control: Theory, Methods and Applications Vol. 22, Chapman and Hall/CRC Press, 2004.

The invention claimed is:
1. Method, carried out by at least one of a navigation satellite system receiver, hereinafter abbreviated as "NSS receiver", and a processing entity capable of receiving data from the NSS receiver, for estimating parameters useful to determine a position, the NSS receiver observing a NSS signal from each of a plurality of NSS satellites over multiple epochs, each of these epochs being hereinafter referred to as "receiver epoch", the method comprising:
  operating a first filter, hereinafter referred to as "timely estimator", and a second filter, hereinafter referred to as "precise estimator", wherein
    each of the timely estimator and precise estimator uses state variables;
    each of the timely estimator and precise estimator computes values of their state variables based on at least one of: NSS signals observed by the NSS receiver, and information derived from said NSS signals;
    the precise estimator computes the values of the state variables that it uses further based on at least one of: observations that are not derived from NSS signals observed by the NSS receiver, and information derived from said observations; and
    the precise estimator is delayed by at least one receiver epoch with respect to the timely estimator;
  recurrently replacing, in the timely estimator, the value of each of a subset of the state variables computed by the timely estimator with:
    the respective value of the corresponding state variable computed by the precise estimator,
    a respective value computed based on the values of a subset of the state variables computed by the precise estimator, or
    a respective value computed based on: the values of a subset of the state variables computed by the timely estimator and the values of a subset of the state variables computed by the precise estimator; and
  using the recurrently replaced values of the subset of state variables in the timely estimator to determine a position.
2. Method of claim 1, wherein the timely estimator comprises at least one of a Kalman filter, a least squares estimator, and a robust estimator.
3. Method of claim 1, wherein the precise estimator comprises at least one of a Kalman filter, a least squares estimator, and a robust estimator.
4. Method of claim 1, wherein the state variables whose values in the timely estimator are recurrently replaced are sufficiently constant over the at least one receiver epoch by which the precise estimator is delayed with respect to the timely estimator such that a position accuracy is not compromised.

5. Method of claim 1, wherein the state variables whose values in the timely estimator are recurrently replaced are expected to have constant or near constant stochastic models over the at least one receiver epoch by which the precise estimator is delayed with respect to the timely estimator.

6. Method of claim 1, wherein the state variables whose values in the timely estimator are recurrently replaced comprise at least one of:
- ionospheric biases;
- tropospheric biases;
- satellite orbital biases;
- satellite clock errors;
- carrier phase ambiguities;
- carrier phase multipath errors; and
- code phase multipath errors.

7. Method of claim 1, wherein the state variables whose values in the timely estimator are recurrently replaced comprise at least one of:
- carrier phase biases;
- code phase biases; and
- carrier-phase-smoothed code phase biases.

8. Method of claim 1, wherein each of the timely estimator and precise estimator computes the values of their state variables based on carrier phase measurements generated based on the NSS signals observed by the NSS receiver.

9. Method of claim 1, wherein the timely estimator computes the values of its state variables further based on a navigation solution computed based on data from at least one of:
- an inertial navigation system of, or connected to, the NSS receiver; and
- a distance measurement instrument navigation system of, or connected to, the NSS receiver.

10. Method of claim 1, wherein the observations that are not derived from NSS signals observed by the NSS receiver comprise NSS observations from at least one reference receiver.

11. Method of claim 10, wherein the precise estimator computes the values of its state variables based on differences between:
- NSS observations made based on the NSS signals observed by the NSS receiver, and the NSS observations from the at least one reference receiver.

12. Method of claim 1, wherein recurrently replacing comprises:
recurrently replacing, in the timely estimator, the value of each of a subset of the state variables and associated covariances computed by the timely estimator with:
- the respective value of the corresponding state variable and an associated covariance computed by the precise estimator,
- respective values computed based on the values of a subset of the state variables and associated covariances computed by the precise estimator, or
- respective values computed based on: the values of a subset of the state variables and associated covariances computed by the timely estimator and the values of a subset of the state variables and associated covariances computed by the precise estimator.

13. Method of claim 1, wherein recurrently replacing comprises:
recurrently replacing, in the timely estimator, the value of each of a subset of the state variables computed by the timely estimator with a respective value computed, by a collator of a federated filter, based on: the values of a subset of the state variables computed by the timely estimator and the values of a subset of the state variables computed by the precise estimator.

14. System comprising at least one of a navigation satellite system receiver, hereinafter abbreviated as "NSS receiver", and a processing entity capable of receiving data from the NSS receiver, for estimating parameters useful to determine a position, the NSS receiver observing a NSS signal from each of a plurality of NSS satellites over multiple epochs, each of these epochs being hereinafter referred to as "receiver epoch", the system comprising:
a first filter, hereinafter referred to as "timely estimator", and a second filter, hereinafter referred to as "precise estimator", wherein
each of the timely estimator and precise estimator is configured to use state variables;
each of the timely estimator and precise estimator is configured to compute values of their state variables based on at least one of: NSS signals observed by the NSS receiver, and information derived from said NSS signals;
the precise estimator is configured to compute the values of the state variables that it uses further based on at least one of: observations that are not derived from NSS signals observed by the NSS receiver, and information derived from said observations; and
the precise estimator is configured to be delayed by at least one receiver epoch with respect to the timely estimator;
the system being configured for recurrently replacing, in the timely estimator, the value of each of a subset of the state variables computed by the timely estimator with:
the respective value of the corresponding state variable computed by the precise estimator,
a respective value computed based on the values of a subset of the state variables computed by the precise estimator, or
a respective value computed based on: the values of a subset of the state variables computed by the timely estimator and the values of a subset of the state variables computed by the precise estimator; and
the system being further configured for using the recurrently replaced values of the subset of state variables in the timely estimator to determine a position.

15. Computer program or set of computer programs comprising computer-readable instructions configured, when executed on a computer or set of computers, to cause the computer or set of computers to carry out the method according to claim 1.

* * * * *